United States Patent
Lee et al.

(10) Patent No.: US 11,025,814 B2
(45) Date of Patent: Jun. 1, 2021

(54) ELECTRONIC DEVICE FOR STORING DEPTH INFORMATION IN CONNECTION WITH IMAGE DEPENDING ON PROPERTIES OF DEPTH INFORMATION OBTAINED USING IMAGE AND CONTROL METHOD THEREOF

(71) Applicant: Samsung Electronics Co., Ltd., Gyeonggi-do (KR)

(72) Inventors: Woo Yong Lee, Gyeonggi-do (KR); Dae Hyun Sung, Gyeonggi-do (KR); Dong Hoon Kim, Seoul (KR); Ki Huk Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 132 days.

(21) Appl. No.: 16/107,389

(22) Filed: Aug. 21, 2018

(65) Prior Publication Data

US 2019/0068889 A1 Feb. 28, 2019

(30) Foreign Application Priority Data

Aug. 22, 2017 (KR) .................. 10-2017-0106336

(51) Int. Cl.
*H04N 5/232* (2006.01)
*H04N 5/247* (2006.01)

(52) U.S. Cl.
CPC ... *H04N 5/232127* (2018.08); *H04N 5/23222* (2013.01); *H04N 5/232125* (2018.08);
(Continued)

(58) Field of Classification Search
CPC ............. H04N 5/232127; H04N 5/247; H04N 5/232935; H04N 5/23222;
(Continued)

(56) References Cited

U.S. PATENT DOCUMENTS 9,336,440 B2 5/2016 Ramachandran et al.
10,129,455 B2 11/2018 Du et al.
(Continued)

FOREIGN PATENT DOCUMENTS

EP 3 190 781 7/2017
KR 1020130056808 5/2013
WO WO 2015/077778 5/2015

OTHER PUBLICATIONS

European Search Report dated Apr. 17, 2020 issued in counterpart application No. 18847465.4-1208, 7 pages.
(Continued)

*Primary Examiner* — Lin Ye
*Assistant Examiner* — John H Morehead, III
(74) *Attorney, Agent, or Firm* — The Farrell Law Firm, P.C.

(57) ABSTRACT

An electronic device is provided. The electronic device includes a first camera, a second camera, and a processor. The processor is configured to obtain a first image using the first camera and obtain a second image using the second camera, determine depth information corresponding to an external object, using the first image and the second image, when properties of the depth information meet a first specified condition, store the depth information in connection with the first image and the second image, and when the properties of the depth information meet a second specified condition, skip the storing of the depth information in connection with the first image and the second image.

19 Claims, 25 Drawing Sheets

(52) U.S. Cl.
CPC ....... *H04N 5/232935* (2018.08); *H04N 5/247* (2013.01); *H04N 5/23296* (2013.01)

(58) Field of Classification Search
CPC ......... H04N 5/232125; H04N 5/23296; H04N 5/265; H04N 5/23293; H04N 5/2258; H04N 13/271; H04N 13/189; H04N 13/25; H04N 13/239
See application file for complete search history.

(56) References Cited

U.S. PATENT DOCUMENTS

| | | | |
|---|---|---|---|
| 10,455,141 | B2 | 10/2019 | Du et al. |
| 2015/0116529 | A1 | 4/2015 | Wu et al. |
| 2015/0146926 | A1 | 5/2015 | Ramachandran et al. |
| 2015/0201182 | A1* | 7/2015 | Chang .................. H04N 13/239 348/47 |
| 2016/0094779 | A1* | 3/2016 | Arakawa .......... H04N 5/232125 348/348 |
| 2016/0117829 | A1* | 4/2016 | Yoon .................... H04N 5/2258 348/222.1 |
| 2017/0127048 | A1* | 5/2017 | Nobayashi ........... H04N 13/128 |
| 2017/0150067 | A1* | 5/2017 | Han ..................... H04N 5/2351 |
| 2017/0214846 | A1 | 7/2017 | Du et al. |
| 2017/0264884 | A1* | 9/2017 | Chou .................. H04N 5/2226 |
| 2018/0020207 | A1* | 1/2018 | Sugimura ............ G01B 11/245 |
| 2018/0160046 | A1* | 6/2018 | Nash .................... H04N 5/2258 |
| 2018/0231885 | A1* | 8/2018 | Du ........................ H04N 5/247 |
| 2019/0028631 | A1 | 1/2019 | Du et al. |

OTHER PUBLICATIONS

Jeon et al., "Stereo Matching with Color and Monochrome Cameras in Low-Light Conditions" IEEE Conference on Computer Vision and Pattern Recognition (CVPR), Jun. 2016, 10 pgs.
Korean Office Action dated Mar. 16, 2021 issued in counterpart application No. 10-2017-0106336, 9 pages.

* cited by examiner

FIG. 2A  | Tele Image | Wide Image | Out focus Image | depth | Meta data |

FIG. 2B  | Tele Image | Wide Image | Meta data |

FIG. 2C  | Tele Image | Wide Image | 2d object Info | Meta data |

FIG. 2D  | Tele Image | Wide Image | 3D object Info | depth | Meta data |

ELECTRONIC DEVICE FOR STORING DEPTH INFORMATION IN CONNECTION WITH IMAGE DEPENDING ON PROPERTIES OF DEPTH INFORMATION OBTAINED USING IMAGE AND CONTROL METHOD THEREOF

CROSS-REFERENCE TO RELATED APPLICATION(S)

This application is based on and claims priority under 35 U.S.C. § 119 to Korean Patent Application Serial No. 10-2017-0106336, filed on Aug. 22, 2017, in the Korean Intellectual Property Office, the entire disclosure of which is incorporated herein by reference.

BACKGROUND

1. Field

The present disclosure relates generally to electronic devices and methods, and more particularly to electronic devices and methods for determining depth information using a plurality of images obtained using a dual camera.

2. Description of the Related Art

An electronic device may have a dual camera and may capture an image using the dual camera. The dual camera may be configured to have different angles of view and may be installed in different positions of the electronic device.

The electronic device may determine depth map information using a first image and a second image obtained from the dual camera. The determined depth map information may be applied to a variety of image processing which uses at least one of the first image or the second image.

Depth map information may decrease in validity depending on shooting conditions. For example, in case of low illumination or when a distance between an electronic device and an external object becomes too close to each other, a first image or a second image may deteriorate in image quality. As the first image or the second image deteriorates in image quality, since depth map information determined using the first and second images has low quality, the depth map information may fail to have validity. Furthermore, when the distance between the electronic device and the external object becomes too distant from each other, since the electronic device is unable to obtain a disparity using the first image and the second image, it may fail to determine depth map information using the first image and the second image. Additionally, when reference texture information is not included in a focus area in the first image and the second image, depth map information determined using the first image and the second image may fail to have validity. When the depth map information does not have validity, processing using the depth map information may decrease in validity or accuracy.

SUMMARY

The present disclosure has been made to address at least the disadvantages described above and to provide at least the advantages described below.

Aspects of the present disclosure are to address at least the above-mentioned problems and/or disadvantages and to provide at least the advantages described below. Accordingly, an aspect of the present disclosure is to provide an electronic device for ensuring validity of depth map information stored in connection with a plurality of images to some degree and a control method thereof.

Accordingly, another aspect of the present disclosure is to provide an electronic device for determining a structure of a file including content with better quality using depth map information and a control method thereof.

In accordance with an aspect of the present disclosure, an electronic device is provided. The electronic device includes a first camera, a second camera, and a processor. The processor is configured to obtain a first image using the first camera and obtain a second image using the second camera, determine depth information corresponding to an external object, using the first image and the second image, when properties of the depth information meet a first specified condition, store the depth information in connection with the first image and the second image, and when the properties of the depth information meet a second specified condition, skip the storing of the depth information in connection with the first image and the second image.

In accordance with another aspect of the present disclosure, a control method of an electronic device is provided. The method includes obtaining a first image using a first camera of the electronic device and a second image using a second camera of the electronic device, determining depth information corresponding to an external object, using the first image and the second image, when properties of the depth information meet a first specified condition, storing the depth information in connection with the first image and the second image, and when the properties of the depth information meet a second specified condition, skipping the storing of the depth information in connection with the first image and the second image.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 2A, 2B, 2C, and 2D are diagrams of a format of an extension file, according to an embodiment;

DETAILED DESCRIPTION

Figure 1:
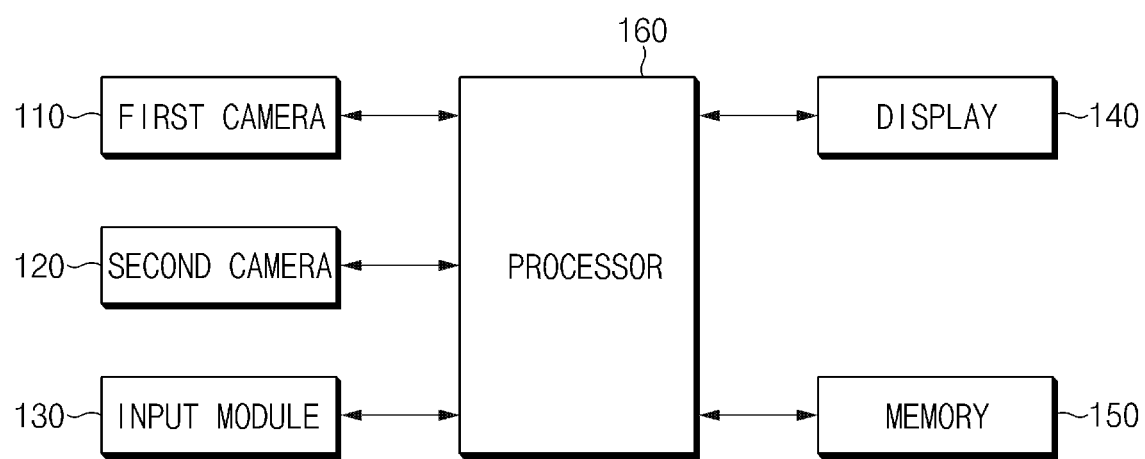
FIG. 1 is a diagram of a configuration of an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

FIG. 1 is a diagram of a configuration of an electronic device, according to an embodiment.

Referring to FIG. 1 an electronic device 10 may include a first camera 110, a second camera 120, an input module 130, a display 140, a memory 150, and a processor 160. The electronic device 10 may further include at least one of an illumination sensor or a distance sensor. Some of the elements of the electronic device 10 may be combined with each other to be configured as one entity. The electronic device 10 may perform functions of the elements before the combination in the same manner. An input/output relationship shown in FIG. 1 is, but is not limited to, only an example for convenience of description.

The first camera 110 may include a first lens assembly and a first image sensor. The first camera 110 may be a wide-angle camera. The first lens assembly may be configured to have a first angle of view and a first focal distance. The first image sensor may obtain a first image corresponding to an external object (e.g., a subject) by converting light transmitted through the first lens assembly from the external object into an electrical signal. Due to properties of the first lens assembly, an image obtained from the first camera 110 may be an image which is focused within a first field of view (FOV). The first image sensor may be implemented as a charged coupled device (CCD) sensor or a complementary metal oxide semiconductor (CMOS) sensor.

The second camera 120 may include a second lens assembly and a second image sensor. The second camera may be a telephoto camera. The second lens assembly may be configured to have a second angle of view and a second focal distance. The second angle of view may be less than the first angle of view, and the second focal distance is greater than the first focal distance. The second image sensor may obtain a second image corresponding to the external object by converting light transmitted through the second lens assembly from the external object into an electrical signal. Due to a difference between properties of the first lens assembly and properties of the second lens assembly, the second image may be an image which is focused within a second FOV and may be an image including a portion of the entire region of the first image. The second FOV may be relatively wider than the first FOV. The second image may include an image corresponding to an area (e.g., a partial area of the first image) as the first image is zoomed in on by a specified magnification (e.g., double) with respect to an optical center of the first image. In contrast, the partial region may be another region. However, as an example, the partial region is shown as the above-mentioned region. The second image sensor may be implemented as a CCD sensor or a CMOS sensor.

At least one of the first camera 110 or the second camera 120 may detect an amount of light and may output information about the detected amount of light. The at least one camera may select a pixel included in at least one of pixels included in at least one of column lines of an inactive region of an image sensor, which are not used to obtain an image, and pixels included in at least one of row lines of the inactive region of the image sensor and may average analog signals detected by a photodiode of the selected pixel to calculate a luminance average value, thus outputting the calculated luminance average value as information about an amount of light.

The input module 130 may detect or receive a user input. The input module 130 may include at least one of a touch screen, a touch panel, or a button key. The user input may be associated with at least one of driving a camera, setting an image storage format, capturing an image, adjusting a focus position, or selecting an effect applied to an image.

The display 140 may include a liquid crystal display (LCD), a light emitting diode (LED) display, an organic LED (OLED) display, or an electronic paper display. The display 140 may display a variety of content (e.g., a text, an image, a video, an icon, a symbol, etc.) to a user. The display 140 may display an image (e.g., a live view image) obtained using at least one of the first camera 110 or the second camera 120 based on instructions of the processor 160.

The memory 150 may be a volatile memory (e.g., a random access memory (RAM) or the like), a nonvolatile memory (e.g., a read only memory (ROM), a flash memory, or the like), or a combination thereof. The memory 150 may store instructions or data associated with at least one other element(s) of the electronic device 10. The memory 150 may store an instruction set for determining depth map information using a first image and a second image. The memory 150 may store an instruction set for determining whether properties of depth map information meet a specified condition (e.g., a validity criterion). The memory 150 may store an instruction set for generating a specified extension file. The memory 150 may store an instruction set for performing an image effect function at a time when an extension file is generated or reproduced. The function may include a zoom in/out function, a refocus function, a live focus function, or the like. The live focus function may include at least one of a focus position change function or a blur level adjustment function based on a first image and a second image. The refocus function may include at least one of a function of changing a focus position or a function of adjusting a blur level of a background region, based on a first capture image and a second capture image.

When verifying an input for requesting to drive a camera through the input module 130, the processor 160 may drive the first camera 110 and the second camera 120. When the first camera 110 and the second camera 120 are driven, in a live view mode, the processor 160 may obtain a first image using the first camera 110 and may obtain a second image using the second camera 120, thus outputting at least one of the first image or the second image on the display 140. The processor 160 may output the first image on the display 140.

The processor 160 may verify settings of an image storage format in the live view mode. The image storage format may include at least one of a single image format or an extension file format. The single image format may be a format in which an image (e.g., a first capture image) captured using the first camera 110 and an image (e.g., a second capture image) captured using the second camera 120 are separately stored without correlating with each other. The extension file format may be a format in which an image (e.g., the first capture image) captured using the first camera 110 and an image (e.g., the second capture image) captured using the second camera 120 correlate with each other to be stored in one extension file. The extension file format may be determined according to validity of depth map information determined using the first capture image and the second capture image.

When the single file format is set as the image storage format, the processor 160 may fail to separately determine depth map information when capturing each image using the first camera 110 and the second camera 120. On the other hand, when the extension file format is set as the image storage format, the processor 160 may determine depth map information using a first image and a second image and may generate the extension file format by correlating the depth map information with a first capture image and a second capture image only when the determined depth map information meets a specified condition. Hereinafter, a description will be given in detail of the process of generating the extension file format at the processor 160.

Prior to image capture, the processor 160 may determine depth map information per specified period while outputting at least one of a first image obtained from the first camera 110 or a second image obtained from the second camera 120 on the display 140. The specified period may be a time when depth map information is determined. The processor 160 may determine depth map information using a disparity between areas which are duplicated on the first image and the second image. The processor 160 may determine depth map information using stereo vision technology. Since the duplicated area corresponds to a partial region of the first image, the depth map information may be generated to a size corresponding to the partial region of the first image corresponding to the entire region of the second image.

The processor 160 may determine whether properties of the depth map information determined using the first image and the second image meet a specified condition. When the properties of the depth map information meet the specified condition, the processor 160 may generate a first capture image through image capture using the first camera 110 and may generate a second capture image through image capture using the second camera 120. The specified condition may be a criterion for determining whether the depth map information is valid. The specified condition may be ambient illumination intensity being greater than or equal to specified illumination intensity. The processor 160 may determine whether the ambient illumination intensity is greater than or equal to the specified illumination intensity, based on information about an amount of light. The specified condition may be a distance between the electronic device 10 and an external object being within a specified distance range. The processor 160 may verify a distance between the electronic device 10 and the external object based on a depth value included in depth map information and may determine whether the determined distance is within a specified distance range. The specified distance range may include an FOV of the first camera 110 and an FOV of the second camera 120. The specified condition may be texture information (referred to as "reference texture information") meeting a specified reference texture condition being included in the depth map information. When a difference between a depth value of a focus area and a depth value of an area around the focus area is less than a specified value in the depth map information, the processor 160 may determine that the reference texture information is not included in the depth map information.

When properties of the depth map information determined using the first image and the second image meet a portion of the specified condition, the processor 160 may generate a first capture image and a second capture image using only one of the first camera 110 and the second camera 120. The portion of the specified condition may include a condition corresponding to when there is an image with better quality between the first capture image and the second capture image. When ambient illumination intensity is less than specified illumination intensity or when a distance between the electronic device 10 and an external object is less than a first specified distance, the processor 160 may generate the first capture image using the first camera without capturing an image using the second camera 120 and may generate the second capture image by enlarging (e.g., digitally zooming in on) the first capture image by a specified magnification. The first specified distance may be less than a lower limit of a specified distance range. The first specified distance may be greater than or equal to the shortest distance among distances included in an FOV of the first camera 110 and may be less than the shortest distance among distances included in an FOV of the second camera 120. When a distance between the electronic device 10 and an external object is greater than a second specified distance, the processor 160 may generate a first capture image using the second camera 120 without capturing an image using the first camera 110 and may generate a second capture image by enlarging (e.g., digitally zooming in on) the first capture image by a specified magnification. The second specified distance may be greater than or equal to an upper limit of the specified distance range. The second specified distance may be a distance of being greater than or equal to the longest distance among distances included in the FOV of the second camera 120.

When the properties of the depth map information determined using the first and second images do not meet the specified condition in the live view mode, the processor 160 may fail to determine a depth map using a first capture image and a second capture image at a time when the first capture image is generated using the first camera 110 and when the second capture image is generated using the second camera 120. The time may be a time when a request for image capture through the input module 130 is verified and when the generation of the first and second capture images is completed as the image capture is performed. When the depth map information determined using the first and second images is not valid, the processor 160 may skip an unnecessary procedure in a process of generating an extension file by skipping the process of determining the depth map information using the first and second capture images.

When the properties of the depth map information determined using the first and second images meet the specified condition in the live view mode and when respectively generating a first capture image and a second capture image using the first camera 110 and the second camera 120, the processor 160 may determine depth map information using the first capture image and the second capture image and may re-verify whether properties of the determined depth map information meet the specified condition. Although depth map information is valid before image capture (e.g., in the live view mode) using the first camera 110 and the second camera 120, the processor 160 according to an embodiment may re-determine whether validity of depth map information is changed due to an environmental change or the like during the image capture.

When the properties of the depth map information determined using the first capture image and the second capture image meet the specified condition as a result of the reverification, the processor 160 may generate a processed image using the first capture image and the second capture image. The processor 160 may receive position information of a focus area from at least one of the first camera 110 or the second camera 120 and may verify the focus area based on the received position information. The focus area may include an area including a person. The processor 160 may verify the focus area on the second capture image and may generate a processed image by processing an area, in which depth values of the focus area are different, based on depth map information. The processing may include blurring, deterioration in sensitivity, or the like. The processed image may include an area corresponding to the second capture image.

When the processed image is generated, the processor 160 may generate an extension file of a first format including the first capture image, the second capture image, and the processed image and may store the extension file of the first format in the memory 150. The extension file of the first format may include the first capture image, the second capture image, depth map information, the processed image, and metadata. The metadata may include depth map information and information about a processed image other than basic information associated with the first capture image and the second capture image. The basic information may include an image capture time, an image capture position (e.g., a GPS), correspondence information between the first capture image and the second capture image, or the like. The correspondence information may include at least one of an optical center of each of the first capture image and the second capture image or information about areas which correspond to each other with respect to the optical center. The depth map information and the metadata may be stored as information about properties of each of the first capture image and the second capture image.

When the properties of the depth map information determined using the first and second capture images do not meet the specified condition, the processor 160 may generate an extension file of a second format which does not include the depth map information and may store the extension file of the second format in the memory 150. The extension file of the second format may include the first capture image, the second capture image, and the metadata. The metadata may include basic information and may fail to include the depth map information.

When a request to overlay a specified object (referred to as "overlay mode") is received through the input module 130, the processor 160 may overlay the specified object on an image output on the display 140 between the first image and the second image. The specified object may be a sunglasses image overlaid on eye regions of a user, a hat image overlaid on a head region of the user, or the like.

In the overlay mode, the processor 160 may determine depth map information per specified period using the first and second images and may verify whether properties of the determined depth map information meet a specified condition. When the properties of the depth map information determined using the first image and the second image do not meet the specified condition, the processor 160 may fail to determine depth map information using the first capture image and the second capture image although generating the first capture image and the second capture image using at least one of the first camera 110 or the second camera 120. When the properties of the depth map information determined using the first image and the second image meet the specified condition, the processor 160 may determine depth map information using the first and second capture images and may re-verify whether properties of the determined depth map information meet the specified condition.

In the overlay mode, when the properties of the depth map information determined using the first and second images do not meet the specified condition or when the properties of the depth map information determined using the first and second capture images do not meet the specified condition, the processor 160 may generate two-dimensional (2D) position information of a specified object and may store the 2D position information in connection with at least one of the first capture image or the second capture image. The 2D position information may include 2D coordinates (x, y) of an area where the specified object is overlaid on at least one of the first capture image or the second capture image and a rotation angle about an original angle of the specified object. The processor 160 may generate an extension file of a third format including the 2D position information and may store the extension file of the third format in the memory 150. The extension file of the third format may include the first capture image, the second capture image, the 2D position information, and metadata. The processor 160 may synthesize an object specified to correspond to the 2D position information with the first capture image or the second capture image. The extension file of the third format may fail to separately include the 2D position information.

In the overlay mode, when the properties of the depth map information determined using the first capture image the second capture image meet the specified condition, the processor 160 may verify three-dimensional (3D) position information of a specified object based on the determined depth map information and may store the 3D position information in connection with the first capture image, the second capture image, and the depth map information. The 3D position information may include at least one of 3D coordinates or a 3D rotation angle of an area where a specified object is overlaid on at least one of the first capture image and the second capture image. The 3D rotation angle may include a rotation angle about axes (x, y, z) with respect to a reference point of the specified object. The processor 160 may generate an extension file of a fourth format including the 3D position information and may store the extension file of the fourth format in the memory 150. The extension file of the fourth format may include the first capture image, the second capture image, depth map information, the 3D position information, and metadata. The processor 160 may synthesize an object specified to correspond to the 3D position information with at least one of the first capture image or the second capture image and may store the image with which the specified object is synthesized, rather than at least one of the first capture image or the second capture image. The extension file of the fourth format may fail to include the 3D position information.

When a request to reproduce a stored extension file is received through the input module 130, the processor 160 may output the extension file on the display 140 to correspond to a format of the extension file requested to be reproduced. When an extension file is selected on a gallery, the processor 160 may determine that reproduction of the extension file is requested.

When the extension file has the first format including a first capture image, a second capture image, depth map information, a processed image, and metadata, the processor 160 may output at least a portion of the first capture image, the second capture image, or the processed image on the display 140 when reproducing the extension file. When the extension file is selected, the processor 160 may output a representative image of the extension file on the display 140. The representative image may be the second image or the processed image.

While outputting the representative image on the display 140, when a zoom-in function is requested through the input module 130, the processor 160 may output the first capture image on the display 140. The processor 160 may fade out the representative image and may fade in the first capture image. When a zoom-out function is requested through the input module 130 while outputting the first capture image on the display 140, the processor 160 may output the representative image on the display 140. The processor 160 may fade out the first capture image and may fade in the representative image. The processor 160 may prevent deterioration in image quality in the process of performing the zoom in/out function by storing capture images of a dual camera (e.g., the first camera 110 and the second camera 120) without synthesizing the capture images.

While outputting the representative image on the display 140, when a refocus function is requested through the input module 130, the processor 160 may apply a refocus effect on the representative image based on depth information of a depth map included in an extension file and may output the representative image to which the refocus effect is applied on the display 140. The processor 160 may verify a depth value corresponding to a focus position to be changed from the representative image and may output an image, the focus position of which is changed, by blurring an area having a depth value different from a depth value verified from the second capture image. When a request to store the image with the changed focus position is received, the processor 160 may newly store the image or may update and store a processed image. When a request to increase or decrease a blur level on the representative image is received, the processor 160 may increase or decrease the blur level with respect to an area (e.g., a background area) having a depth value different from a depth value of a focus area using a processed image or a second capture image. The processor 160 may change a focus position or a blur level with respect to an image upon completion of the capture of the image.

When the extension file has the first format, while outputting a representative image of the extension file, when a first area is selected on the representative image and when a request to overlay a first object on the selected region is received, the processor 160 may determine 3D position information (e.g., a rotation angle and a depth to be overlaid) of the first object depending on a depth value of the selected area and may overlay the object to correspond to the determined 3D position information. Since depth map information is valid, a 3D effect represented using an extension file may be valid using the valid depth map information. When overlaying an object on a captured image, the processor 160 may have a stereo effect on the object.

When the extension has a second format including a first capture image, a second capture image, and metadata, the processor 160 may output at least a portion of the first capture image or the second capture image on the display 140 when reproducing the extension file. The processor 160 may verify an image selected through the input module 130 between the first capture image and the second capture image and may output the selected image on the display 140. The processor 160 may output a representative image between the first capture image and the second capture image on the display 140. The processor 160 may provide a zoom-in/out function when outputting the selected image or the representative image on the display 140. When the zoom-in/out function is requested while outputting one of the first capture image and the second capture image on the display 140, the processor 160 may output the other of the first capture image and the second capture image.

When the extension file has a third format including a first capture image, a second capture image, 2D position information of a specified object, and metadata, the processor 160 may overlay and output an object specified in a representative image output on the display 140 depending on reproduction of the extension file on a position according to the 2D position information.

When the extension file has a fourth format including a first capture image, a second capture image, depth map information, 3D position information of a specified object, and metadata, the processor 160 may overlay and output an object specified in a representative image output on the display 140 depending on reproduction of the extension file of the fourth format on a position according to the 3D position information.

The processor 160 may share the first capture image and the second capture image with another electronic device (e.g., a server). The processor 160 may transmit an image or file corresponding to an input through the input module 130 among the first capture image, the second capture image, or the extension file to another electronic device via a communication module. The electronic device 10 may receive a first capture image, a second capture image, or an extension file, which is stored in another electronic device, from the other electronic device. The electronic device 10 may receive an image or file corresponding to an input through the input module 130 among the first capture image, the second capture image, or the extension file from another electronic device.

When displaying a thumbnail of an extension file, the processor 160 may further display function information associated with the extension file. When displaying a thumbnail of an extension file in a 'gallery' folder, the processor 160 may further display function information associated with the extension file. The function information may include information about a function automatically provided upon reproduction of an extension file. When the extension file (e.g., the extension file of the second format) provides a zoom-in/out function, function information of the extension file may include an icon (e.g., text zoom) indicating that the zoom-in/out function is automatically provided. When the extension file (e.g., the extension file of the first format) is able to provide the zoom-in/out function and a refocus function, function information of the extension file may include an icon (e.g., text zoom) indicating that it is able to provide the zoom-in/out function and an icon (e.g., text focus) indicating that it is able to provide the refocus function.

When reproducing the extension file in response to a request to reproduce the extension file, the processor 160 may automatically provide the zoom-in/out function. While outputting a second capture image included in the extension file, the processor 160 may output a first capture image included in the extension file. While outputting the second capture image, the processor 160 may have a specified conversion effect and may output the first capture image. The specified conversion effect may include a fade-in/out effect, blurring of the entire image, or the like. The processor 160 may first output a first capture image included in an extension file and may then output a second capture image included in the extension file.

When reproducing an extension file in response to a request to reproduce the extension file, the processor 160 may automatically provide a refocus function. When reproducing the extension file, while outputting a second capture image, included in the extension file, a first area of which is focused, the processor 160 may output the second capture image, a second area of which is focused. When outputting a second capture image, a short-range object of which is focused, the processor 160 may output a second capture image, a long-range object of which is focused. While outputting a second capture image, a long-range object of which is focused, the processor 160 may output a second image capture image, a short-range object of which is focused. The processor 160 may determine a speed at which a second capture image with a different focus area is provided, based on a difference between a depth value of the short-range object and a depth value of the long-range object. When the difference between the depth value of the short-range object and the depth value of the long-range object is large, a speed change from the second capture image with the short-range object focused and the second capture image with the long-range object focused is fast, and the speed may be slow when it is vice versa. Metadata may include function information automatically provided upon reproduction of an extension file, a speed at which a function is provided (e.g., a speed at which an image is changed), a specified conversion effect (e.g., a blur effect), or the like.

The processor 160 may verify ambient illumination intensity using an illumination sensor. Further, the processor 160 may verify a distance between the electronic device 10 and an external object using a distance sensor.

The electronic device 10 may generate the depth map information using the stereo version technology. The electronic device 10 may include a depth sensor and may obtain depth map information using the depth sensor. The electronic device 10 may determine depth map information for the entire region of a first image or the entire region of a second image.

According to various embodiments, in a live view mode, the processor 160 may temporarily store (e.g., stored at volatile memory) the depth map information determined by using the first and second images at the memory 150. The processor 160 may store (e.g., stored at nonvolatile memory) or erase the temporarily stored depth map information when the first and second capture images were obtained, using the first camera 110 and the second camera 120.

According to one embodiment, when properties of the depth map information, determined by using the first and second images, meet the specified condition, the processor 160 may store the temporarily stored depth map information in connection with the first and second image when the first and second capture images were obtained by using the first camera 110 and the second camera 120. For example, the processor 160 may correlate the temporarily stored depth map information with the first and second image, and generate an extension file including the temporarily stored depth map information and the first and second image. In this case, the processor 160 may skip the operation determining the depth map information which uses the first and second capture images. Regarding this, the processor 160 may verify whether the first and second images respectively correspond to the first and second capture images. In addition, the processor 160 may skip the operation determining the depth map information which uses the first and second capture images if the first and second images respectively correspond to the first and second capture images. The processor 160, for example, may determine that the first and second images correspond to the first and second capture images when an object included in the first and second images consists of the first and second capture images.

According to one embodiment, when properties of the depth map information determined by using the first and second images do not meet the specified condition, the processor 160 may erase the temporarily stored depth map information when the first and second capture images were obtained by using the first camera 110 and the second camera 120.

The electronic device 10 may determine a structure of a file including content (e.g., an image, depth map information, or the like) with better quality using depth map information.

An electronic device includes a first camera, a second camera, and a processor. The processor is configured to obtain a first image using the first camera and obtain a second image using the second camera, determine depth information corresponding to an external object, using the first image and the second image, when properties of the depth information meet a first specified condition, store the depth information in connection with the first image and the second image, and when the properties of the depth information meet a second specified condition, skip the storing of the depth information in connection with the first image and the second image.

According to an embodiment, the electronic device further includes a display. The processor is further configured to determine the depth information during at least a portion of outputting at least a portion of the first image or the second image as a live view on the display and perform the storing of the depth information in response to an image capture request.

According to an embodiment, the processor is further configured to determine that the properties of the depth information meet the first specified condition when reference texture information meeting a specified reference texture condition is included in the depth information, ambient illumination intensity meets a specified illumination range, or a distance between the external object and the electronic device meets a specified distance range.

According to an embodiment, the processor is further configured to store the first image, the second image, and the depth information in one file using a specified format.

According to an embodiment, the processor is further configured to, when the properties of the depth information do not meet the first specified condition, determine that the properties of the depth information meet the second specified condition.

According to an embodiment, the second image includes an image corresponding to an area where the first image is zoomed in on by a specified magnification.

According to an embodiment, the processor is further configured to determine a structure of a file which stores the first image and the second image using at least one of the depth information or shooting conditions.

According to an embodiment, the processor is further configured to obtain the first image and the second image by selectively using the first camera or the second camera depending on at least one of a distance between the external object and the electronic device or ambient illumination intensity.

According to an embodiment, the processor is further configured to, when at least one of the first image or the second image, which is stored in connection with the depth information, is selected, output a representative image among images including the first image and the second image on the display.

According to an embodiment, the processor is further configured to, when a request to change a focus area of at least one of the first image or the second image, which is stored in connection with the depth information, is received, change the focus area of the at least one of the first image or the second image based on the depth information in response to the request.

According to an embodiment, the processor is further configured to, when a request to adjust a background blur level of at least one of the first image or the second image, which is stored in connection with the depth information, is received, adjust the background blur level of the at least one of the first image or the second image based on the depth information in response to the request.

FIGS. 2A to 2D are diagrams of a format of an extension file, according to an embodiment. The structure of the extension file of an order of images stored in the extension file may be changed. The extension file may be configured such that a processed image is first located.

Referring to FIGS. 2A to 2D when properties of depth map information determined using a first capture image and a second capture image meet a specified condition, a processor may generate an extension file of a first format. As shown in FIG. 2A, the extension file of the first format may include a tele image (e.g., a second image), a wide image (e.g., a first capture image), an out of focus image (e.g., a processed image), depth map information, and metadata.

When properties of depth map information determined using a first image and a second image do not meet a specified condition or when the properties of the depth map information determined using the first capture image and the second capture image do not meet the specified condition, the processor may generate an extension file of a second format. As shown in FIG. 2B, the extension file of the second format may include a tele image (e.g., a second capture image), a wide image (e.g., a first capture image), and metadata.

In an overlay mode, when the properties of the depth map information determined using the first image and the second image do not meet the specified condition or when the properties of the depth map information determined using the first capture image and the second capture image do not meet the specified condition, the processor may generate an extension file of a third format. As shown in FIG. 2C, the extension file of the third format may include a tele image (e.g., a second capture image), a wide image (e.g., a first capture image), 2D object information, and metadata.

In the overlay mode, when the properties of the depth map information determined using the first capture image and the second capture image meet the specified condition, the processor may generate an extension file of a fourth format. As shown in FIG. 2D, the extension file of the fourth format may include a tele image (e.g., a second capture image), a wide image (e.g., a first capture image), 3D object information, depth map information, and metadata.

The format of the extension file may be configured in the form of including a variety of content depending on a range of valid depth map information.

Figure 3A:
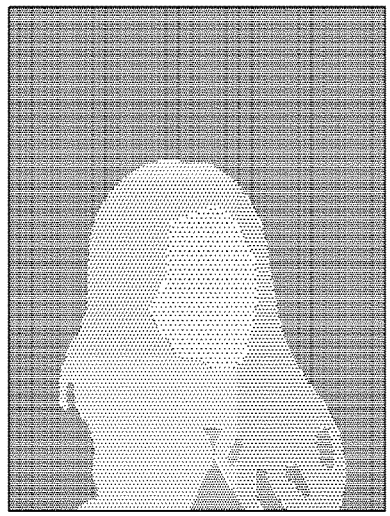
FIGS. 3A, 3B, and 3C are diagrams of a depth map image, according to an embodiment.
Figure 3B:
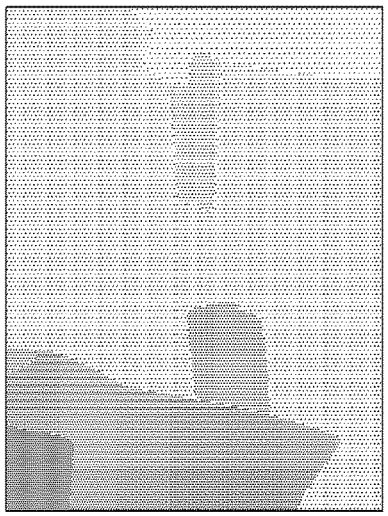
Figure 3C:

FIGS. 3A to 3C are diagrams of a depth map image, according to an embodiment. FIGS. 3A to 3C illustrate three depth map images in parallel.

Referring to FIG. 3A, the depth map image may be displayed with light concentration on an area relatively close to a first camera and a second camera and may be displayed with dark concentration on an area relatively distant from the first camera and the second camera. In FIG. 3A, a difference between a focus area and a background area may be greater than or equal to a specified value in the depth map image. The processor may determine that a reference texture is not included in the depth map image.

In FIG. 3B or 3C, it may be verified that the difference between the focus area and the background area is less than the specified value or that reference texture information is not included in depth map information.

Figure 4:
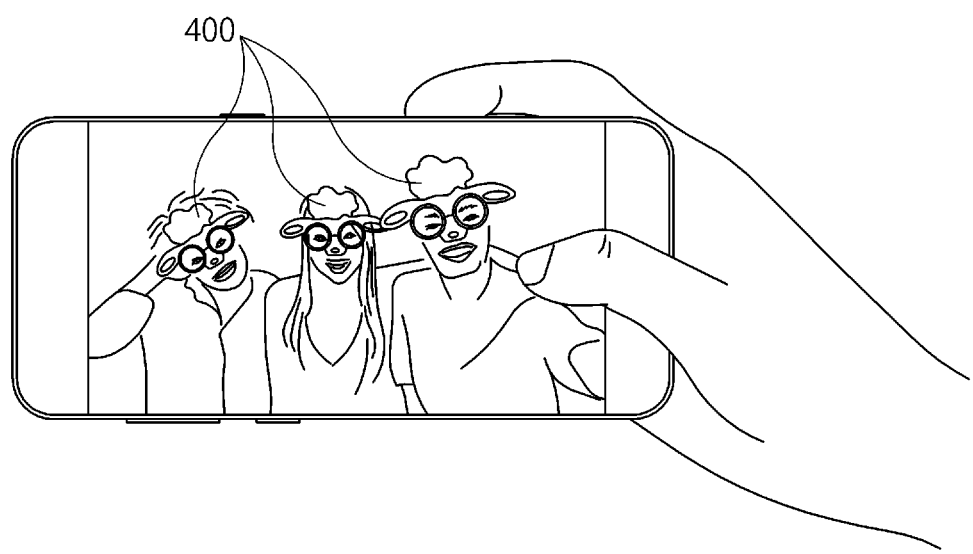
FIG. 4 is a diagram of a user interface (UI) screen of an overlay mode, according to an embodiment.

FIG. 4 is a diagram of a UI screen of an overlay mode, according to an embodiment.

Referring to FIG. 4, a processor may verify a depth value of an area on which an object (e.g., a mask image) 400 is overlaid, based on depth map information determined using first and second capture images in an overlay mode and may determine 3D position information of the object 400 based on the verified depth value. The processor may generate an extension file of a fourth format by associating the first capture image and the second capture image with the 3D position information of the object 400 and may store the generated extension file in a memory. Thereafter, when the extension file of the fourth format is selected, the processor may overlay and display the object 400 to further provide a 3D effect.

Figure 5:
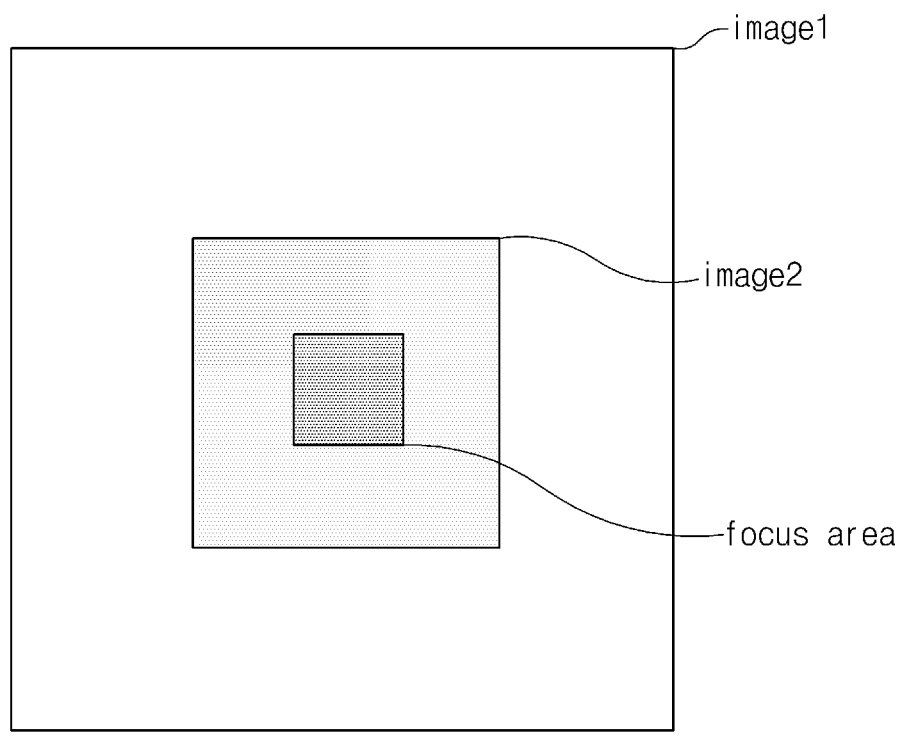
FIG. 5 is a diagram of a relationship between a first image and a second image, according to an embodiment.

FIG. 5 is a diagram of a relationship between a first image and a second image, according to an embodiment.

Referring to FIG. 5 due to properties of a first camera, image1 may be an image of a first size. Due to properties of a second camera, image2 may be an image of a second size. Ideally, since optical centers of the first camera and the second camera are identical to each other, image2 may correspond to an image of an area enlarged by a specified magnification. The focus area may be on an area included in image2.

Since a depth map image is determined or generated for an area which is duplicated in image1 and image2, it may correspond to an area and a size of image2.

FIGS. 6A to 6E are diagrams of a UI screen of a live view mode of a process of generating an extension file, according to an embodiment. The live view mode may be a mode of outputting an image to be captured on a display prior to image capture.

Referring to FIGS. 6A to 6E, a processor may provide a live focus function in the live view mode. For example, the processor may provide the live focus function based on properties of depth map information determined using first and second images in the live view mode. The live focus function may include a function of increasing or decreasing a blur level of an area except for a focus area. The processor may output a first object 610 indicating the entire blur level capable of being adjusted in the live view mode and a second object 620 for setting a blur level to be selected. The processor may verify a blur level corresponding to setting the second object 620 (e.g., dragging the second object 620) through an input module and may blur a background area to correspond to the verified blur level.

Figure 6A:
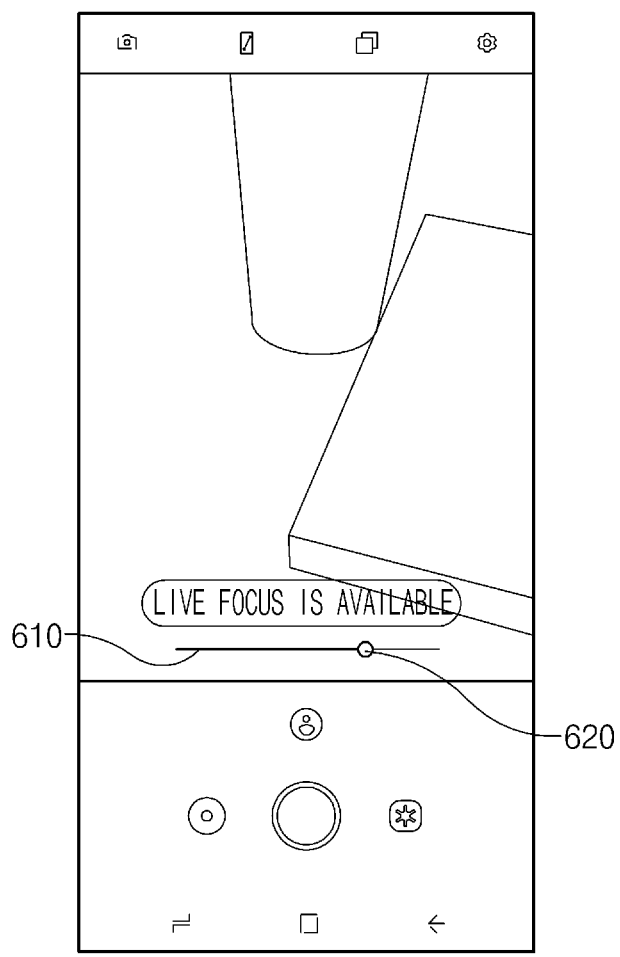
FIGS. 6A, 6B, 6C, 6D, and 6E are diagrams of a UI screen of a live view mode of a process of generating an extension file, according to an embodiment.

Referring to FIG. 6A, when properties of depth map information meet a specified condition, the processor may notify a user that it is possible to adjust a focus in real time (e.g., it is possible to provide the live focus function). The processor may verify that a distance between an external object and an electronic device is within a specified distance range from properties of depth map information determined using first and second images and may verify that ambient illumination intensity is greater than or equal to specified illumination intensity from information about an amount of light provided from a first camera or a second camera and that reference texture information is included in the depth map information. The processor may display a first sentence for notifying the user that it is possible to provide the live focus function using an operation of the input module. The first sentence may be "Live focus is available".

Figure 6B:
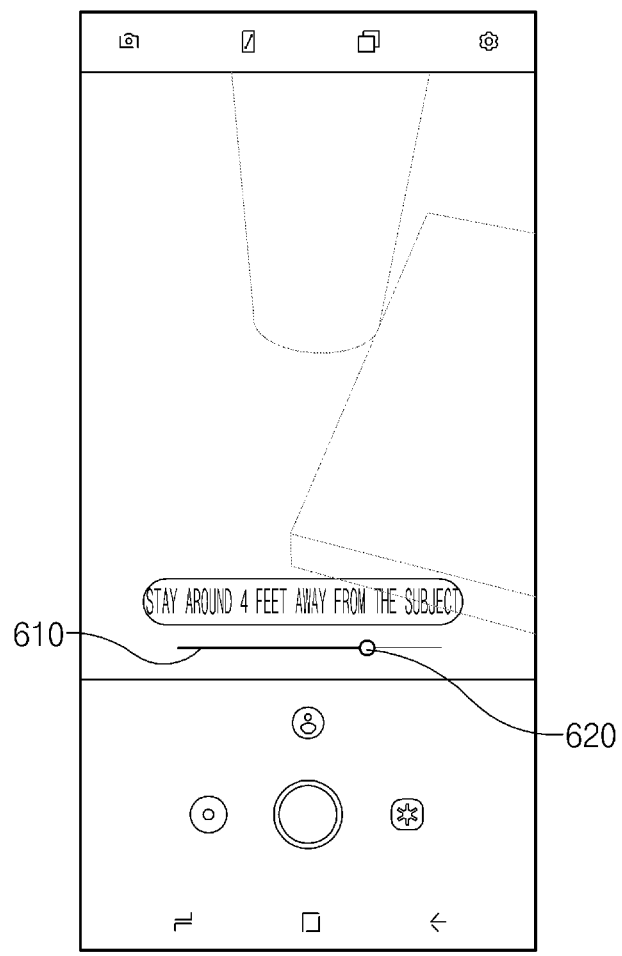

Referring to FIG. 6B, the processor may verify that the distance between the external object and the electronic device is less than a lower limit of the specified distance range, using the properties of the depth map information determined using the first and second images. The processor may output a second sentence for notifying the user that the electronic device should be disposed apart from the external object on a display. The second sentence may be the sentence "Stay around 4 feet away from the subject".

Figure 6C:
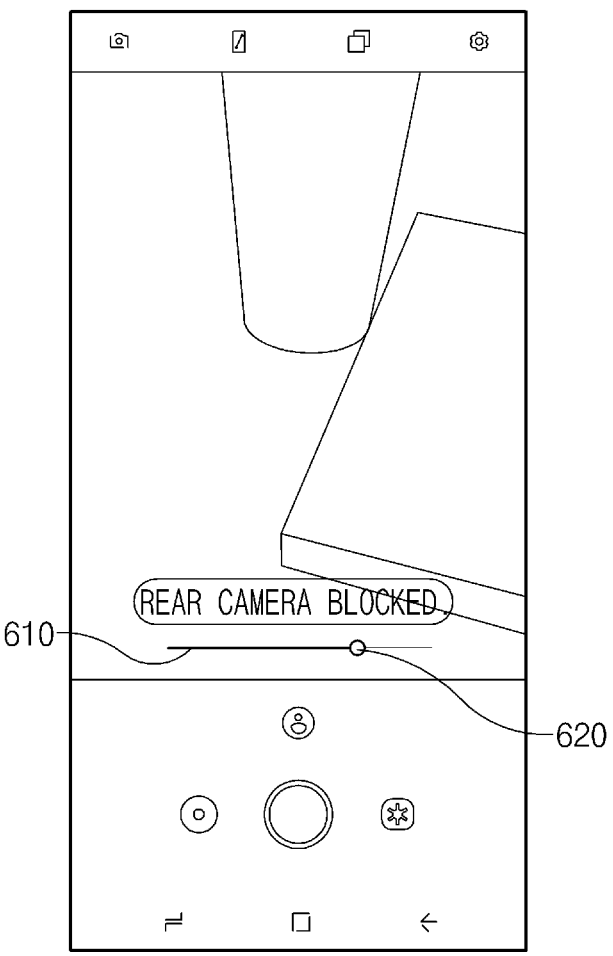

Referring to FIG. 6C, the processor may verify that the first camera or the second camera is blocked, based on at least one of properties of the depth map information, properties of the first image, or properties of the second image. When verifying that a difference between the first image and the second image is greater than a specified difference criterion from the properties of the depth map information determined using the first image and the second image, the processor may verify that the first camera or the second camera is blocked. The processor may output a third sentence for notifying the user that the first camera or the second camera is blocked on the display. The third sentence may be the sentence "Rear camera blocked".

Figure 6D:
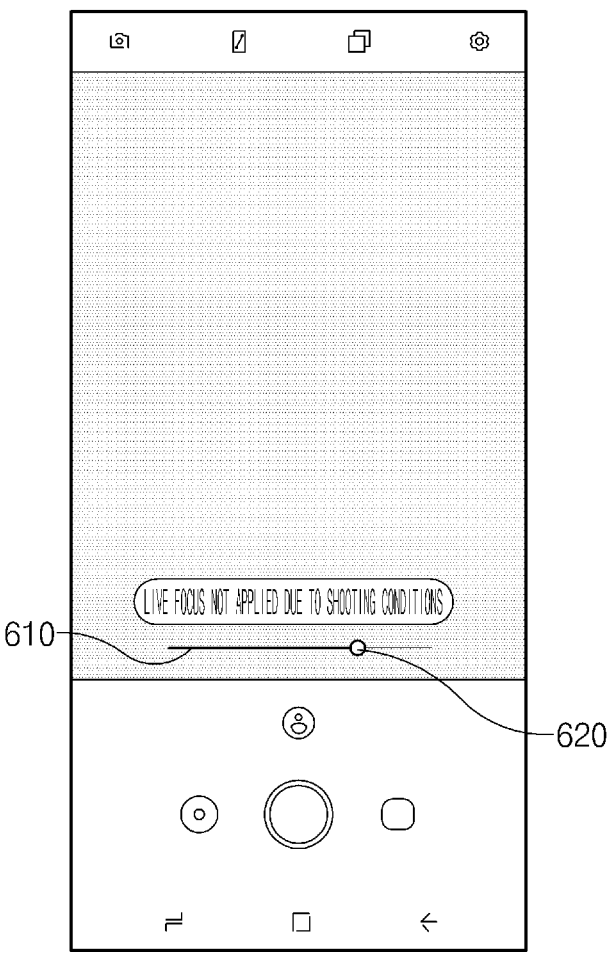

Referring to FIG. 6D, the processor may verify that reference texture information meeting a reference texture condition is not included in the depth map information, using the properties of the depth map information. When a difference between a depth value of a focus area and a depth value of an area around the focus area is less than a specified value in the depth map information, the processor may verify that the reference texture information is not included in the depth map information. When the reference texture information is not included in the depth map information, the processor may output a fourth sentence for notifying the user that it is impossible to provide a live focus function due to shooting conditions on the display. The fourth sentence may be the sentence "Live focus not applied due to shooting conditions".

Figure 6E:
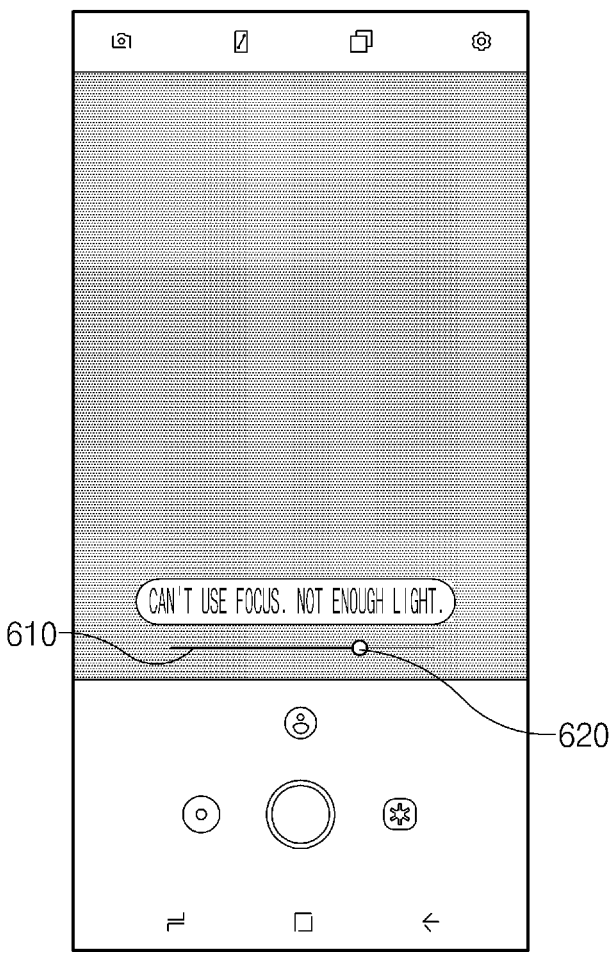

Referring to FIG. 6E, when ambient illumination intensity is less than specified illumination intensity, the processor may output a fifth sentence for notifying the user that it is impossible to provide the live focus function due to low ambient illumination intensity on the display. The fifth sentence may be the sentence "Can't use Live focus. Not enough light."

In FIGS. 6B to 6E, when generating first and second capture images by image capture using the first camera and the second camera, the processor may fail to generate depth map information using the first and second capture images. On the other hand, in FIG. 6A, the processor 160 may generate the first and second capture images by image capture using the first camera and the second camera and may re-verify whether properties of depth map information determined from the first and second capture images meet a specified condition. As a result of the reverification, when the properties of the depth map information meet the specified condition, the processor may store the depth map information in connection with the first and second capture images.

Figure 7:
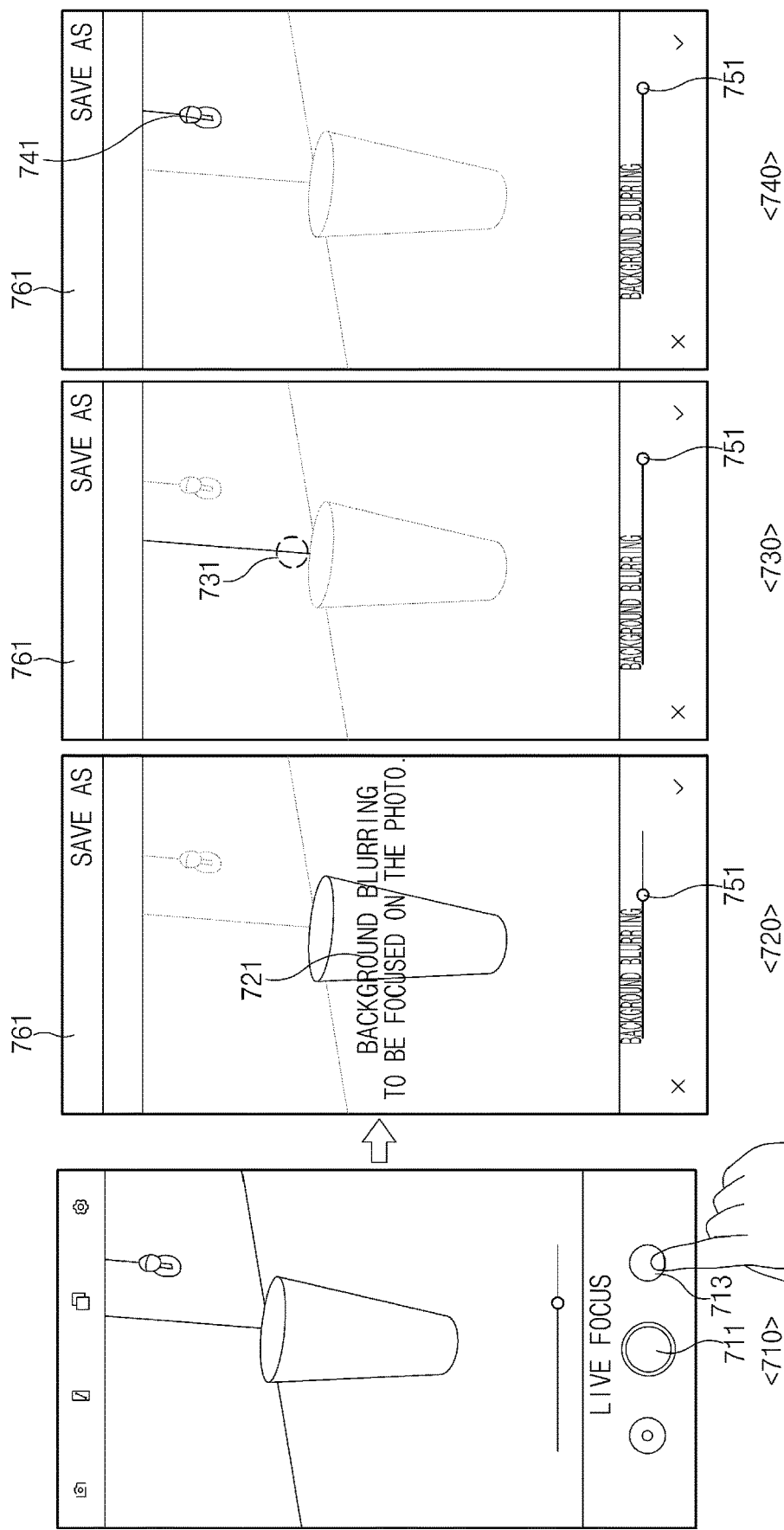
FIG. 7 is a diagram of a refocus function, according to an embodiment.

FIG. 7 is a diagram of a refocus function, according to an embodiment.

Referring to reference numeral 710 of FIG. 7, a processor may verify an input for requesting to perform image capture. The input for requesting to perform the image capture may be selection of an object 711 assigned to perform the image capture. The processor may generate a first capture image and a second capture image depending on the request to perform the image capture and may store the first capture image and the second capture image as an extension file in a memory in connection with depth map information. Thereafter, the processor may verify an input for requesting to reproduce the stored extension file. When verifying selection of an object 713 assigned to reproduce a most recently stored extension file, the processor may fetch the most recently stored extension file. The extension file may include the first capture image, the second capture image, and depth map information.

Referring to reference numerals 720, 730, and 740, the processor may output a representative image (e.g., the second capture image) included in the fetched extension file on a display and may provide a refocus function (e.g., a function of adjusting a blur level or a function of changing a focus position) for images included in the fetched extension file. When an object 751 assigned to perform the function of adjusting the blur level is selected, the processor may change a blur level of a background area except for a focus area using the second capture image depending on a setting using the object 751 (e.g., a drag position of the object 751). When a specific region is selected on a representative image (e.g., the first capture image) of the fetched extension file, the processor may verify the selected area as a focus area to be changed and may blur an area having a depth value different from a depth value of the verified position. The processor may perform blurring to correspond to a depth difference between a focus area and an area around the focus area.

Referring to reference numeral 720, when a short-range object, for example, a cup 721, is selected as a focus position to be changed, the processor may verify a depth value of the cup 721 and may blur an area having a depth value different from the depth value of the cup 721 with respect to the depth value of the cup 721 on the second capture image.

Referring to reference numeral 730, when a middle-range background object, for example, a middle partition 731, is selected as a focus position to be changed, the processor may blur an area having a depth value different from a depth value of the partition 731 with respect to the depth value of the partition 731 on the second capture image.

Referring to reference numeral 740, when a long-range object, for example, a rear doll 741, is selected as a focus position to be changed, the processor may blur an area having a depth value different from a depth value of the doll 741 with respect to the depth value of the doll 741 on the second capture image.

The processor may store an image to which the refocus function is applied, in a new file (e.g., an extension file). When a menu icon 761 assigned to a function of saving as a new file is selected, the processor may save a file to which the refocus function is applied as a new extension file.

Figure 8A:
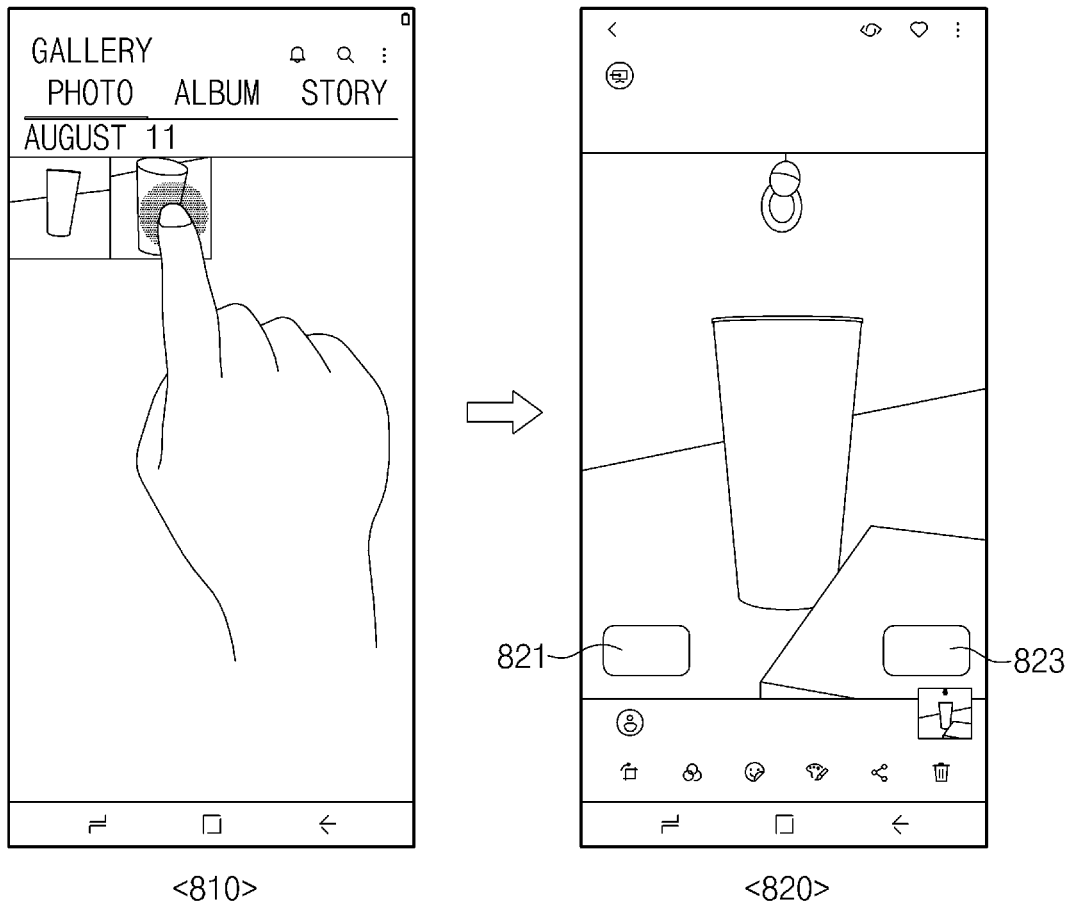
FIG. 8A is a diagram of a process of reproducing an extension file, according to an embodiment.

FIG. 8A is a diagram of a process of reproducing an extension file, according to an embodiment.

Referring to reference numeral 810, when any extension file is selected in a "gallery" folder including extension files, a processor may verify that the selected file is an extension file including depth map information.

Referring to reference numeral 820, the processor may output a representative image (e.g., a second capture image) included in an extension file on a display. The processor may output a menu icon (e.g. a UI) for a function applicable to an image included in the extension file on the representative image. The menu icon may include a first menu icon 821 for selecting a refocus function and a second menu icon 823 for selecting a zoom in/out function.

Figure 8B:
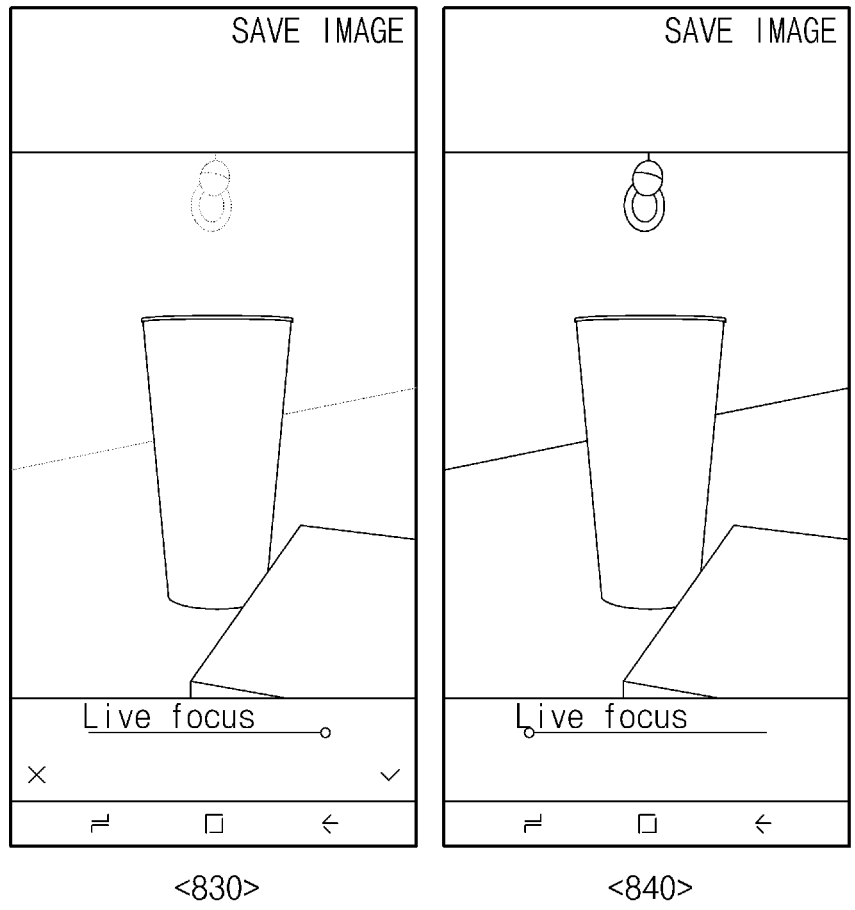
FIG. 8B is a diagram of a UI screen when a refocus function is selected on an image included in an extension file, according to an embodiment.

FIG. 8B is a diagram of a UI screen when a refocus function is selected on an image included in an extension file, according to an embodiment.

Referring to FIGS. 8A and 8B, when the first menu icon 821 for selecting the refocus function is selected, while adjusting a blur level of a background area except for a focus area on a second capture image, the processor may output the second capture image, the blur level of which is adjusted, on the display. For example, as shown at 830, when a blur level is set to a first value (e.g., a max value) from settings of the first menu icon 821, the processor may blur a background area except for a focus area on the second capture image to correspond to the first value. The first value may be the highest configurable strength. As shown at 840, when a blur level is set to a second value (e.g., a minimum value) from the settings of the first menu icon 821, the processor may output the second capture image, a background area of which is not blurred.

Figure 8C:
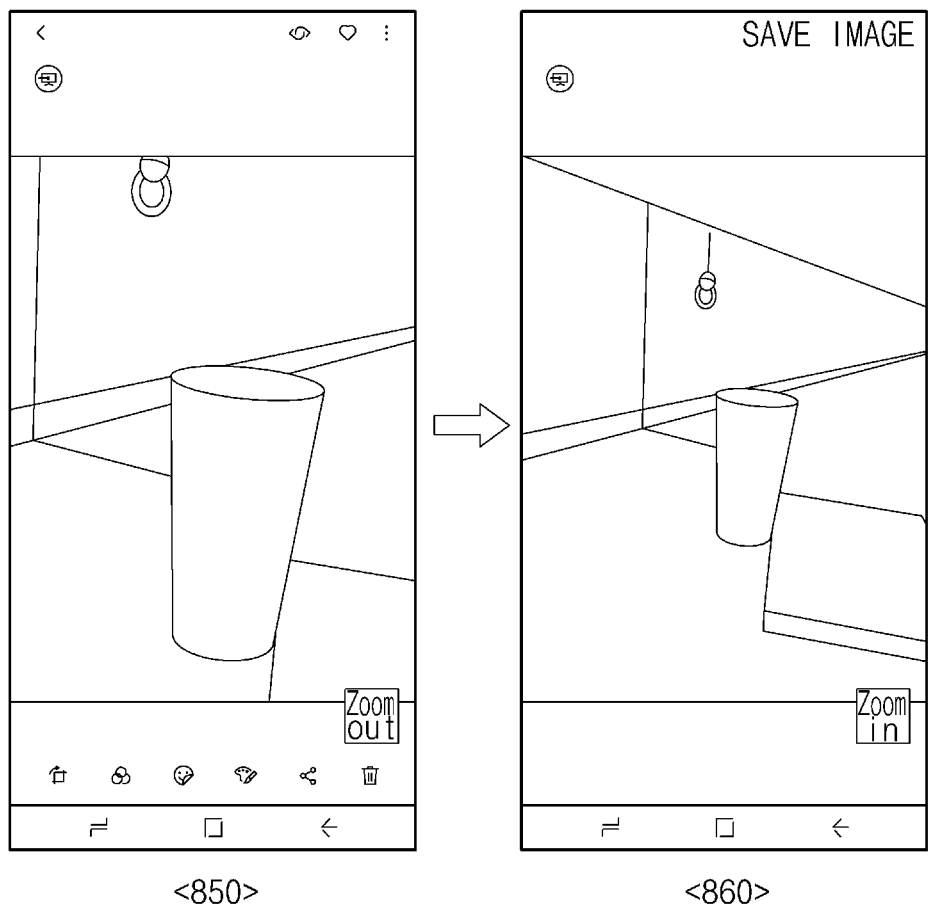
FIG. 8C is a diagram of a UI screen when a zoom in/out effect is applied to an image included in an extension file, according to an embodiment.

FIG. 8C is a diagram of a UI screen when a zoom in/out effect is applied to an image included in an extension file, according to an embodiment.

Referring to FIGS. 8A and 8C, when the second menu icon 823 for selecting the zoom in/out function is selected as shown at 850, while outputting a representative image (e.g., a second capture image) on the display, the processor may output a first capture image on the display. Alternatively, as shown at 860, while outputting the first capture image on the display, the processor may output the representative image (e.g., the second capture image) on the display.

Figure 9A:
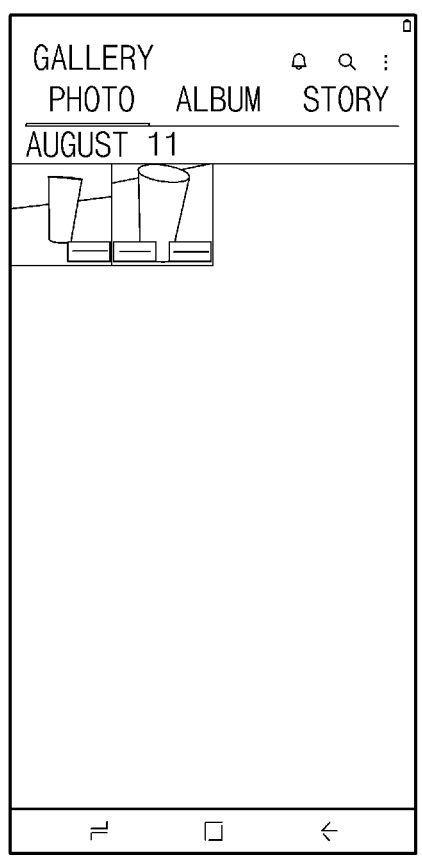
FIG. 9A is a diagram of a thumbnail of an extension file, according to an embodiment.

FIG. 9A is a diagram of a thumbnail of an extension file, according to an embodiment.

Referring to FIG. 9A, as shown at 910, a processor may display function information associated with an extension file on a thumbnail of the extension file. The function information may include information about a function which is automatically provided upon reproduction of the extension file. When an extension file is to provide a zoom-in/out function, function information of the extension file may include an icon (e.g., text zoom) indicating that the zoom-in/out function is automatically provided. When an extension file is able to provide the zoom-in/out function and a refocus function, function information of the extension file may include an icon (e.g., text zoom) indicating that it is able to provide the zoom-in/out function and an icon (e.g., text focus) indicating that it is able to provide the refocus function.

Figure 9B:
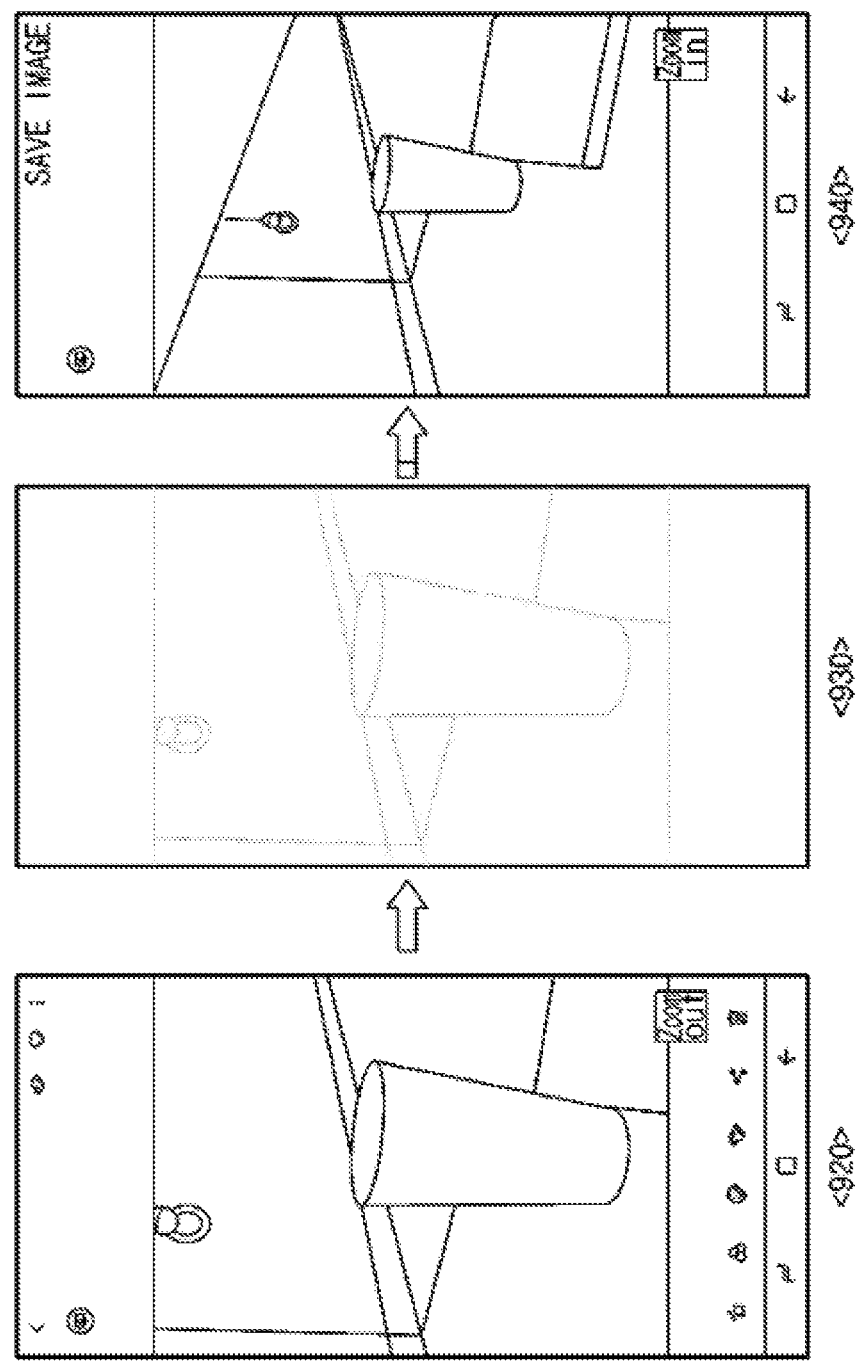
FIG. 9B is a diagram of a UI screen indicating a zoom in/out function being automatically performed upon reproduction of an extension file, according to an embodiment.

FIG. 9B is a diagram of a UI screen indicating a zoom in/out function being automatically performed upon reproduction of an extension file, according to an embodiment.

Referring to FIG. 9B, when reproducing an extension file in response to a request to reproduce the extension file, a processor may automatically provide a zoom-in/out function. While outputting a second capture image included in the extension file, the processor may output a first capture image included in the extension file as shown at 920. While outputting the second capture image, when converting the second capture image into a first capture image, the processor may provide a specified conversion effect as shown at 930. The specified conversion effect may include a fade-in/out effect or the like. The processor may first output the first capture image included in the extension file and may then output the second capture image included in the extension file as shown at 940.

Figure 9C:
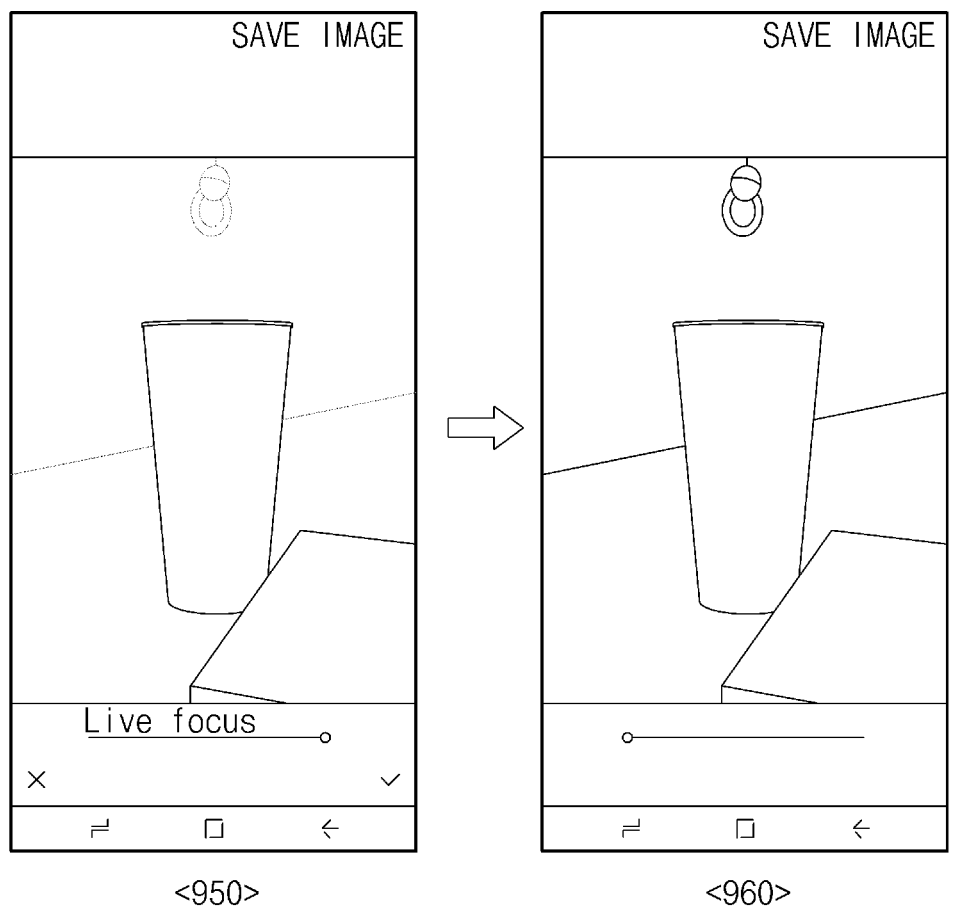
FIGS. 9C and 9D are diagrams of a UI screen indicating a refocus function being automatically performed upon reproduction of an extension file, according to an embodiment.
Figure 9D:
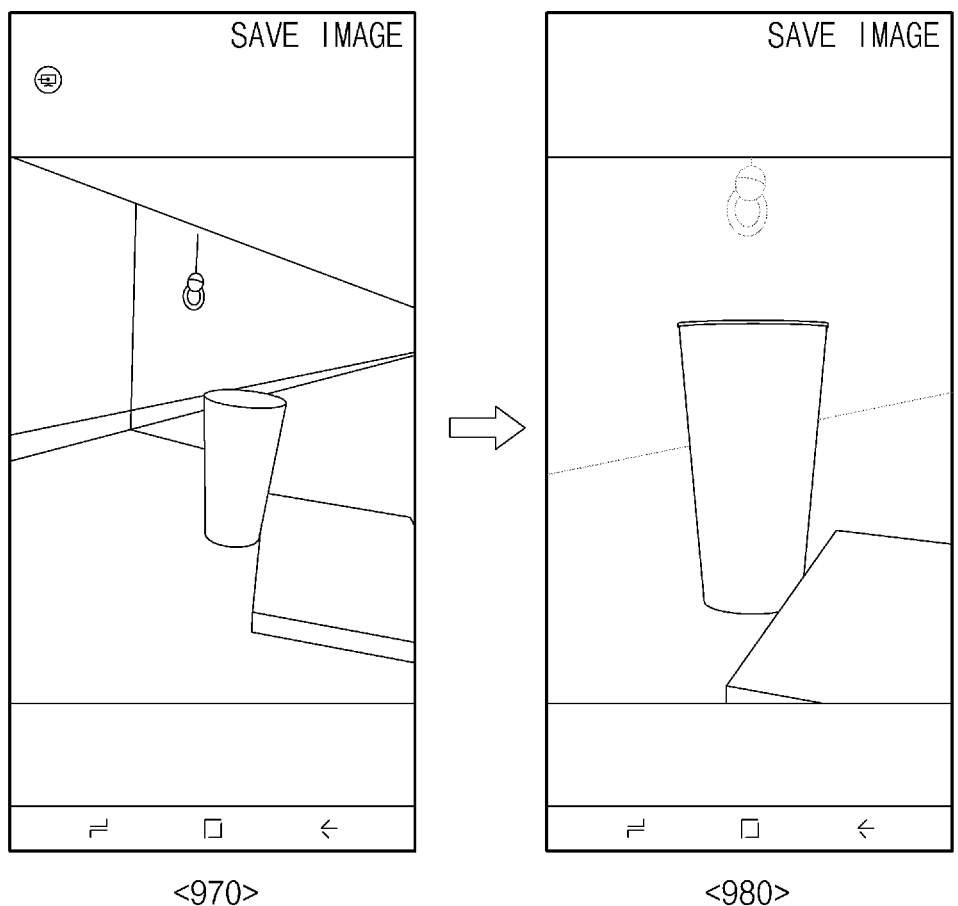

FIGS. 9C and 9D are diagrams of a UI screen indicating a refocus function being automatically performed upon reproduction of an extension file, according to an embodiment.

Referring to FIGS. 9C and 9D, when reproducing an extension file in response to a request to reproduce the extension file, a processor may automatically provide a refocus function. While outputting a second capture image at 950 such as a short-range object (e.g., a cup) which is focused, the processor at 960 may output a second capture image such as a long-range object (e.g., a rear doll) which is focused. In FIG. 9D, while outputting a first capture image at 970, both a long-range object (e.g., a doll) and a short-range object (e.g., a cup) which are focused, the processor at 980 may output a second capture image having only the short-range object which is focused and the long-range object which is not focused.

The processor may determine a speed at which second capture images, each of which has a different focus area, are provided, based on a difference between a depth value of the short-range object and a depth value of the long-range object. When the difference between the depth value of the short-range object and the depth value of the long-range object is large, a speed at which the second capture image including the short-range object which is focused is converted into the second capture image including the long-range object which is focused is relatively fast, and, vice versa, the speed may be determined to be relatively slow. Metadata may include function information automatically provided upon reproduction of an extension file, a speed at which a function is provided (e.g., a speed at which an image is changed), a specified conversion effect (e.g., a blur effect), or the like.

Figure 10:
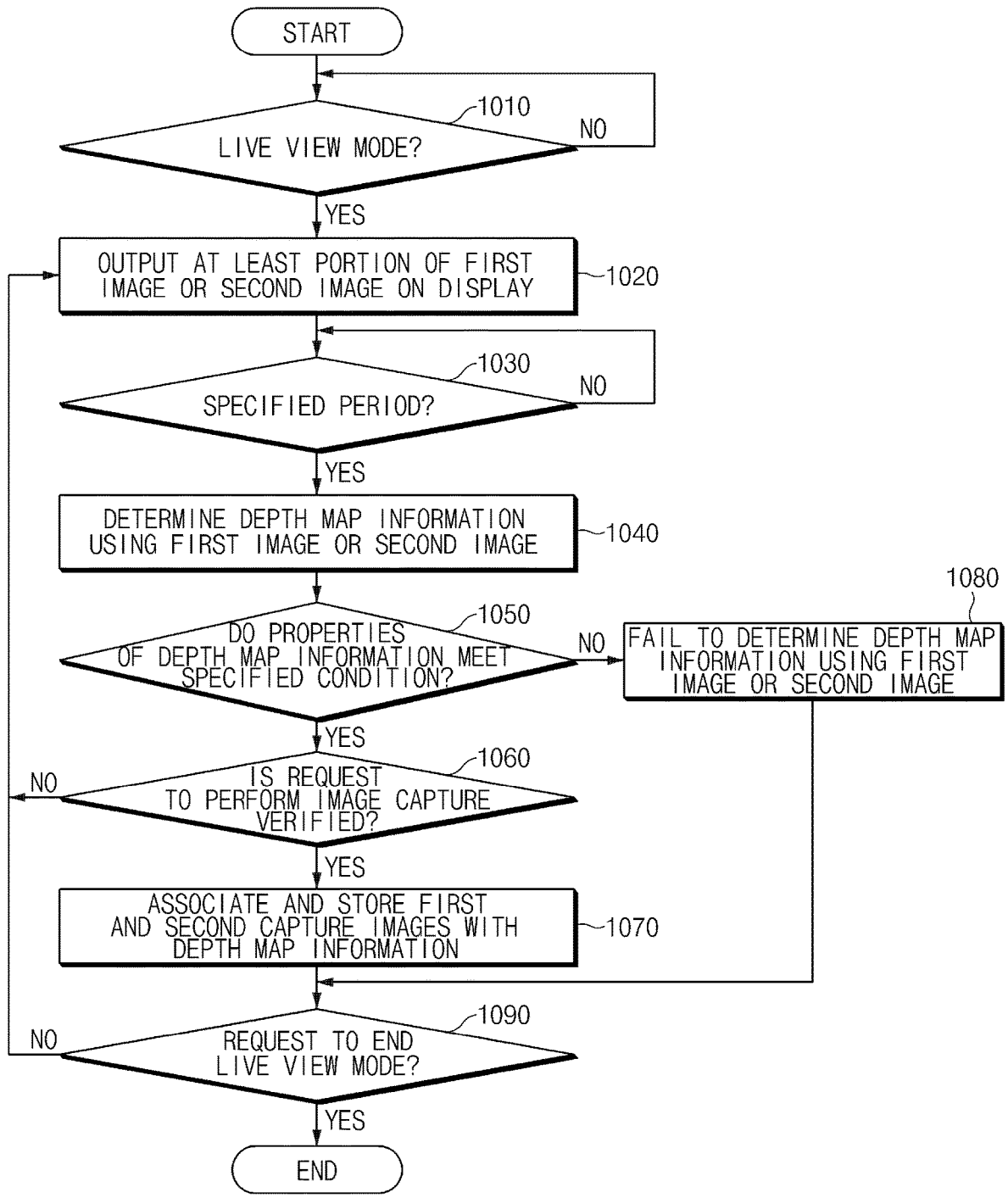
FIG. 10 is a flowchart for generating an extension file, according to an embodiment.

FIG. 10 is a flowchart for generating an extension file, according to an embodiment. FIG. 10 illustrates a method for storing an image when an image storage format is set to an extension file.

Referring to FIG. 10, at step 1010, when a current mode is a live view mode, a processor may drive a first camera and a second camera. The processor may obtain a first image using the first camera and may obtain a second image using the second camera.

At step 1020, the processor may output at least a portion of the first image or the second image as a representative image of the live view mode on a display. The processor may output the second image on the display. The processor may output a partial region of the first image, corresponding to the second image, on the display.

At step 1030, the processor may determine whether a specified period arrives. When the specified period arrives, at step 1040, the processor may determine depth map information using the first image and the second image. The specified period may be a period set to verify validity of the determined depth map information.

At step 1050, the processor may determine whether properties of the depth map information meet a specified condition. The specified condition may be a criterion of verifying validity of the depth map information.

In the condition where the properties of the depth map information meet the specified condition, at step 1060, the processor may determine whether an image capture request is received through an input module.

When the image capture request is received, at step 1070, the processor may generate a first capture image and a second capture image depending on the image capture using the first camera and the second camera and may determine depth map information using the first capture image and the second capture image. The processor may associate the first capture image, the second capture image, and the depth map information and may store an extension file including the first capture image, the second capture image, and the depth map information. The processor may blur an area except for a focus area on the second capture image using the first and second capture images and the depth map information and may generate an extension file to further include the blurred processed image.

When determining that the properties of the depth map information do not meet the specified condition at step 1050, at step 1080, the processor may fail to determine the depth map information using the first and second images. When generating the first capture image and the second capture image, the processor may separately store the first capture image and the second capture image or may associate and store the first capture image with the second capture image.

At step 1090, the processor may determine whether a request to end the live view mode is received. When the request to end the live view mode is received, the processor may end the above-mentioned steps 1080 and 1090. When a request to stop performing image capture is received or when a "gallery" folder is selected, the processor may determine that the request to end the live view mode is received. When the request to end the live view mode is not received, the processor may branch to step 1020.

Figure 11:
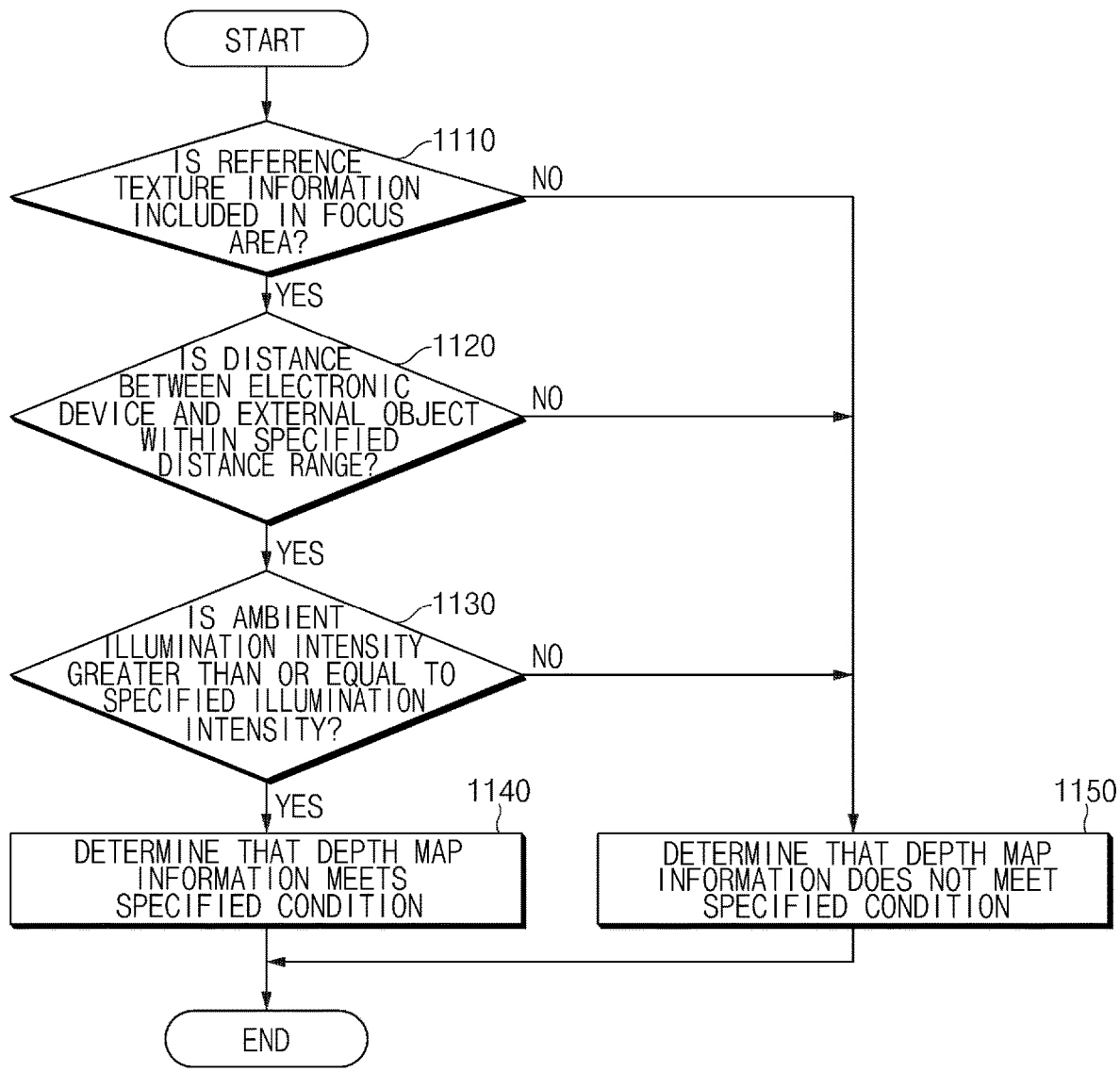
FIG. 11 is a flowchart for verifying validity of depth information, according to an embodiment.

FIG. 11 is a flowchart for verifying validity of depth information, according to an embodiment. Each step of FIG. 11 may be periodically performed in a live view mode or may be performed at a time when image capture is requested.

Referring to FIG. 11, at step 1110, a processor may determine whether reference texture information is included in a focus area from depth map information. When a difference between a depth value of the focus area of the depth map information and a depth value of a background area adjacent to the focus area is less than a specified value, the processor may determine that the reference texture information is not included in the focus area.

At step 1120, the processor may determine whether a distance between an electronic device and an external object is within a specified distance range. The processor may verify the distance between the electronic device and the external object based on a depth value included in the depth map information and may determine whether the verified distance is within the specified distance range. The specified distance range may include an FOV of a first camera and an FOV of a second.

At step 1130, the processor may determine whether ambient illumination intensity is greater than or equal to specified illumination intensity. The processor may receive information about an amount of light from the first camera or the second camera and may determine whether the ambient illumination intensity is greater than or equal to the specified illumination intensity based on the information about the amount of light. The specified illumination intensity may be a criterion for determining a low illumination environment and may be experimentally determined.

At step 1140, when the reference texture information is included in the focus area, when the distance between the electronic device and the external object is within the specified distance range, and when the ambient illumination intensity is greater than or equal to the specified illumination intensity, the processor may determine that the depth map information meets a specified condition.

At step 1150, when at least one of the reference texture information is not included in the focus area, the distance between the electronic device and the external object departs from the specified distance range, and the ambient illumination intensity is less than the specified illumination intensity, the processor may determine that the depth map information does not meet the specified condition.

Figure 12:
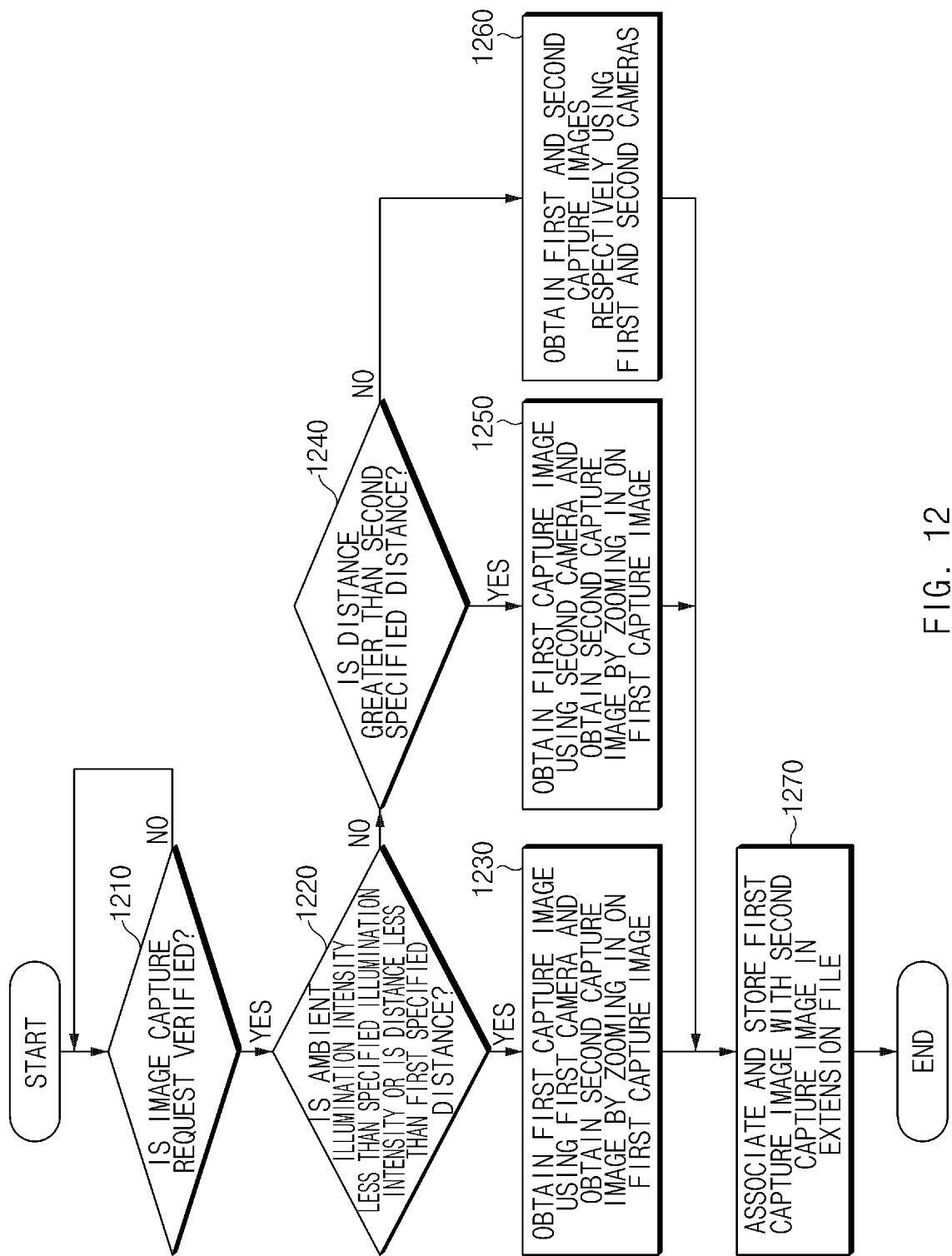
FIG. 12 is a flowchart for generating a capture image, according to an embodiment.

FIG. 12 is a flowchart for generating a capture image, according to an embodiment.

Referring to FIG. 12, at step 1210, a processor may determine whether an image capture request is received through an input module.

At step 1220, the processor may determine whether ambient illumination intensity is less than specified illumination intensity or whether a distance between an electronic device and an external object is less than a first specified distance. The specified illumination intensity may be a criterion for determining a low illumination environment and may be experimentally determined. The first specified distance may be less than a lower limit of a specified distance range.

When determining that the ambient illumination intensity is less than the specified illumination intensity or whether the distance between the electronic device and the external object is less than the first specified distance at step 1220, at step 1230, the processor may obtain a first capture image using a first camera and may obtain a second capture image by enlarging the first capture image by a specified magnification.

When determining that the ambient illumination intensity is greater than or equal to the specified illumination intensity or whether the distance between the electronic device and the external object is greater than or equal to the first specified distance at step 1220, at step 1240, the processor may determine whether the distance between the electronic device and the external object is greater than a second specified distance. The second specified distance may be greater than or equal to an upper limit of the specified distance range.

When determining that the distance between the electronic device and the external object is greater than the second specified distance at step 1240, at step 1250, the processor may obtain a first capture image using a second camera and may obtain a second capture image by enlarging the first capture image by a specified magnification.

When determining that the distance between the electronic device and the external object is less than or equal to the second specified distance at step 1240, at step 1260, the processor may obtain a first capture image using the first camera and may obtain a second capture image using the second camera.

When obtaining the first capture image and the second capture image using the first camera or the second camera at steps 1230 to 1260, at step 1270, the processor may associate and store the first capture image with the second capture image in an extension file. When depth map information meets a specified condition, the processor may generate the depth map information using the first capture image and the second capture image and re-determine whether properties of the depth map information meet the specified condition. When the properties of the depth map information meet the specified condition, the processor may store an extension file which further includes the depth map information.

Figure 13:
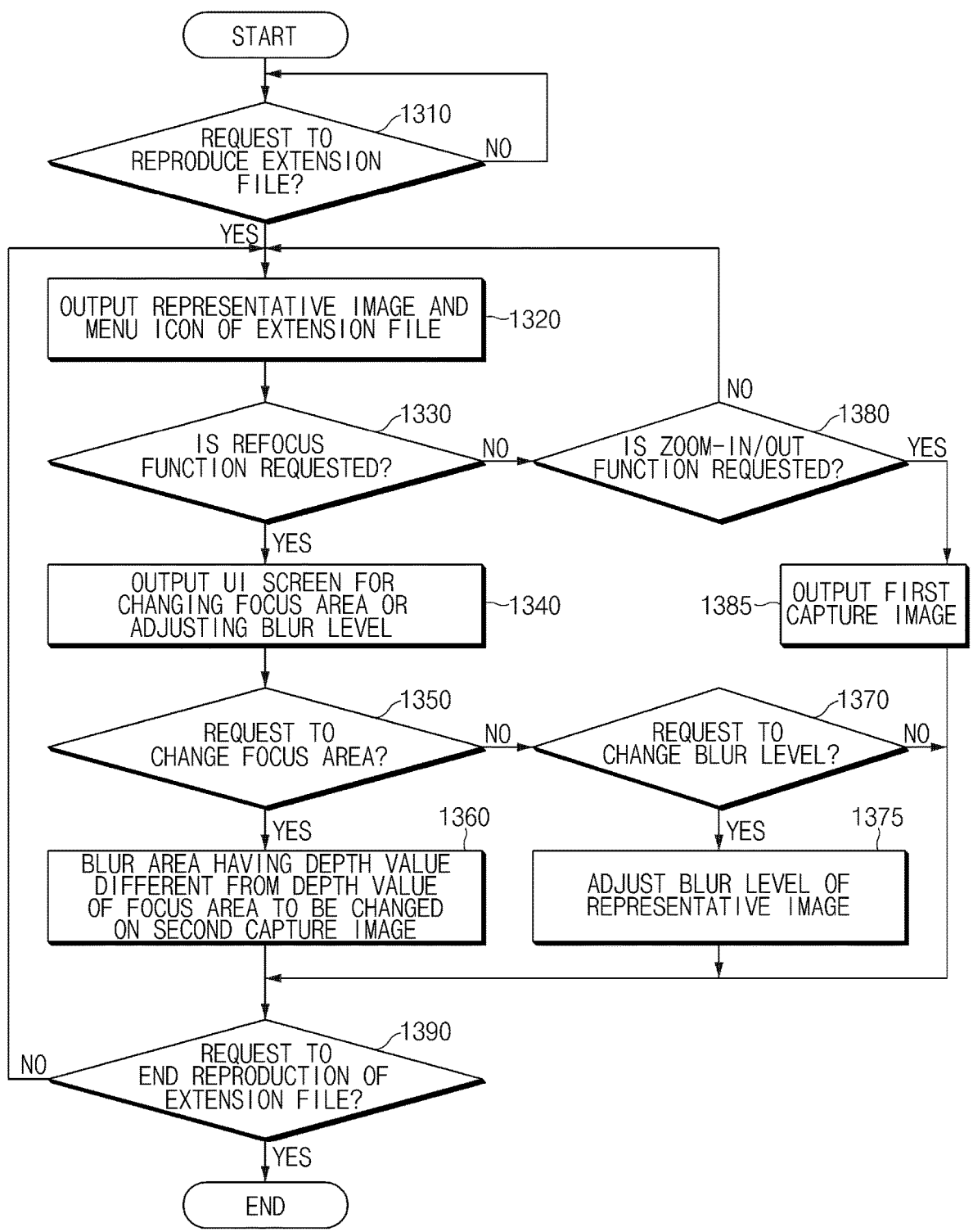
FIG. 13 is a flowchart for reproducing an extension file, according to an embodiment.

FIG. 13 is a flowchart for reproducing an extension file, according to an embodiment.

Referring to FIG. 13, at step 1310, after an extension file is selected from a "gallery" folder, a processor may determine whether a request to reproduce the extension file is received.

At step 1320, when the request to reproduce the extension file is received, the processor may output a representative image and a menu icon among images included in the extension file. The representative image may be a processed image or a first capture image. The menu icon may include at least one of a first menu icon for selecting a refocus function and a second menu icon for selecting a zoom-in/out function.

At step 1330, the processor may determine whether the refocus function is requested. The processor may determine whether a first menu icon for selecting the refocus function is selected.

At step 1340, when the refocus function is requested, the processor may output a UI screen for changing a focus position or adjusting a blur level. The UI screen may include an interface (e.g., a menu icon) for changing a focus position or adjusting a blur level together with a processed image.

At step 1350, the processor may determine whether a request to change a focus position is received through the UI screen. When any region is selected on the UI screen, the processor may determine that the request to change the focus position is received.

When the request to change the focus position is received, at step 1360, the processor may blur an area having a depth value different from a depth value of the focus area on a second capture image and may output the blurred second capture image.

At step 1370, the processor may determine whether a request to adjust a blur level is received through the UI screen. When a third menu icon assigned to adjust a blur level is operated on the UI screen, the processor may determine that the request to adjust the blur level is received.

When the request to adjust the blur level is received, at step 1375, the processor may adjust a blur level of the representative image to correspond to the operation of the third menu icon and may output the representative image, the blur level of which is adjusted.

At step 1380, the processor may determine whether the zoom-in/out function is requested. The processor may determine whether a second menu icon for selecting the zoom-in/out function is selected.

When the zoom-in/out function is requested, at step 1385, the processor may output a first capture image rather than the representative image. At step 1385, the processor may fade out the representative image and may fade in the first capture image to output the fade-in first capture image.

When the zoom-in/out function is requested while outputting the first capture image at step 1385, the processor may output the representative image.

At step 1390, the processor may perform at least one of steps 1320 to 1385 until a request to end the reproduction of the extension file is received.

Figure 14:
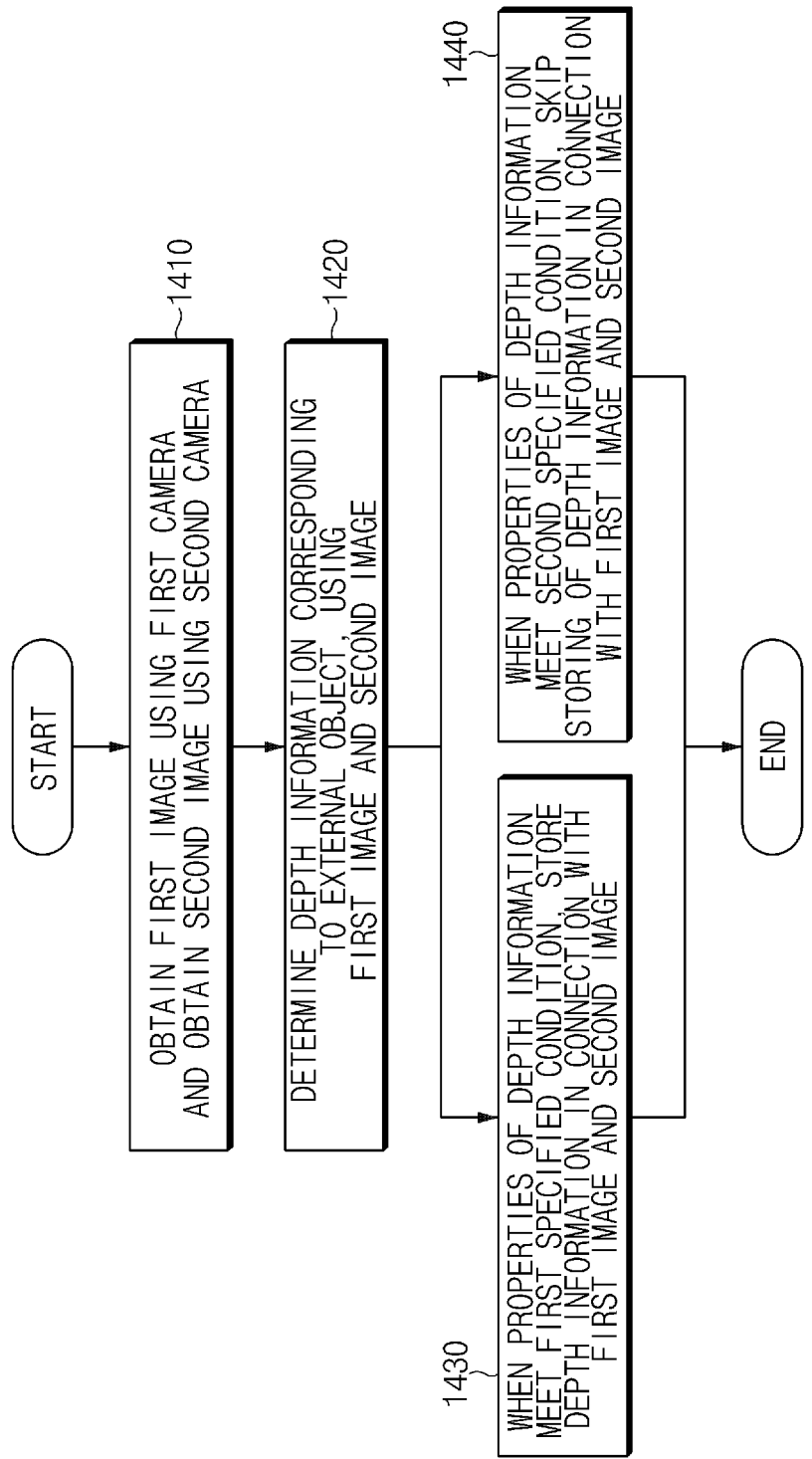
FIG. 14 is a flowchart of a control method of an electronic device, according to an embodiment.

FIG. 14 is a flowchart for a control method of an electronic device, according to an embodiment.

Referring to FIG. 14, at step 1410, a processor—may obtain a first image using a first camera and may obtain a second image using a second camera.

At step 1420, the processor may determine depth information corresponding to an external object, using the first image and the second image. The processor may determine the depth information corresponding to the external object, in a live view mode of outputting at least a portion of the first image or the second image on a display.

At step 1430, when properties of the depth information meet a first specified condition, the processor may store the depth information (e.g., depth map information) in connection with the first image (e.g., a first capture image) and the second image (e.g., a second capture image). When the properties of the depth information meet the first specified condition in the live view mode and when generating a first capture image and a second capture image, the processor may determine depth map information using the first and second capture images and may re-determine whether the depth map information meets the first specified condition. When the depth map information meets the first specified condition as a result of the redetermination, the processor may store the depth map information in connection with the first and second capture images.

At step 1440, when the properties of the depth information meet a second specified condition, the processor may skip the step of storing the depth information in connection with the first image (e.g., the first capture image) and the second image (e.g., the second capture image). When the properties of the depth information meet the second specified condition, they fail to meet the first specified condition.

According to an embodiment, a control method of an electronic device by at least one processor may include obtaining a first image using a first camera of the electronic device and a second image using a second camera of the electronic device, determining depth information corresponding to an external object, using the first image and the second image, when properties of the depth information meet a first specified condition, storing the depth information in connection with the first image and the second image, and when the properties of the depth information meet a second specified condition, skipping the storing of the depth information in connection with the first image and the second image.

According to an embodiment, the determining is performed during at least a portion of outputting at least a portion of the first image or the second image as a live view on a display of the electronic device, and the storing is performed in response to an image capture request.

According to an embodiment, the method further includes determining that the properties of the depth information meet the first specified condition when at least one of reference texture information meeting a specified reference texture condition is included in the depth information, ambient illumination intensity meets a specified illumination range, or a distance between the external object and the electronic device meets a specified distance range.

According to an embodiment, the method further includes when the properties of the depth information do not meet the first specified condition, determining that the properties of the depth information meet the second specified condition.

According to an embodiment, the determining further includes determining the depth information for a duplicated area between the first image and the second image.

According to an embodiment, the obtaining further includes obtaining the first image and the second image by selectively using the first camera or the second camera depending on at least one of a distance between the external object and the electronic device or ambient illumination intensity.

According to an embodiment, the method further includes determining a structure of a file which stores the first image and the second image using at least one of the depth information or shooting conditions.

According to an embodiment, the method further includes when a request to change a focus area of at least one of the first image or the second image, which is stored in connection with the depth information, is received, changing the focus area of the at least one of the first image or the second image based on the depth information in response to the request.

According to an embodiment, the method further includes when a request to adjust a background blur level of at least one of the first image or the second image, which is stored in connection with the depth information, is received, adjusting the background blur level of the at least one of the first image or the second image based on the depth information in response to the request.

Figure 15:
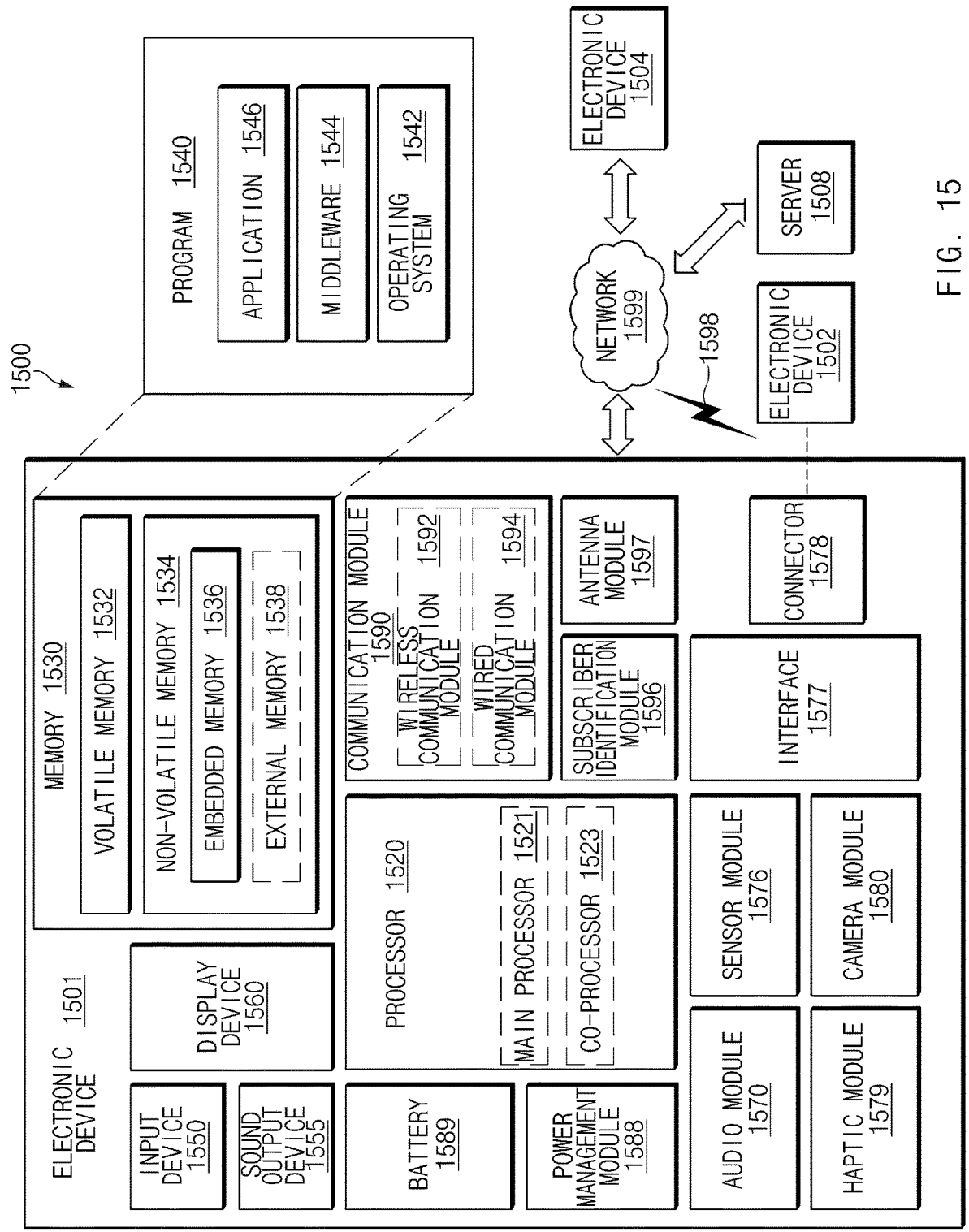
FIG. 15 is a diagram of an electronic device which stores depth information in accordance with a specified condition in a network environment, according to an embodiment.

FIG. 15 is a diagram of an electronic device 1501 which stores depth information in accordance with a specified condition in a network environment 1500, according to an embodiment.

Referring to FIG. 15, the electronic device 1501 may communicate with an electronic device 1502 through a first network 1598 (e.g., a short-range wireless communication) or may communicate with an electronic device 1504 or a server 1508 through a second network 1599 (e.g., a long-distance wireless communication) in the network environment 1500. The electronic device 1501 may communicate with the electronic device 1504 through the server 1508. The electronic device 1501 may include a processor 1520, a memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module 1596, and an antenna module 1597. At least one among components of the electronic device 1501 may be omitted or other components may be added to the electronic device 1501. Some components may be integrated and implemented as in the case of the sensor module 1576 (e.g., a fingerprint sensor, an iris sensor, or an illuminance sensor) embedded in the display device 1560 (e.g., a display).

The processor 1520 may operate, software (e.g., a program 1540) to control at least one of other components (e.g., a hardware or software element) of the electronic device 1501 connected to the processor 1520 and may process and compute a variety of data. The processor 1520 may load a command set or data, which is received from other components (e.g., the sensor module 1576 or the communication module 1590), into a volatile memory 1532, may process the loaded command or data, and may store result data into a nonvolatile memory 1534. The processor 1520 may include a main processor 1521 (e.g., a central processing unit or an application processor) and a co-processor 1523 (e.g., a graphic processing device, an image signal processor, a sensor hub processor, or a communication processor), which operates independently from the main processor 1521, additionally or alternatively uses less power than the main processor 1521, or is specified to a designated function. The coprocessor 1523 may operate separately from the main processor 1521 or embedded.

The co-processor 1523 may control at least some of functions or states associated with at least one component among the components of the electronic device 1501 instead of the main processor 1521 while the main processor 1521 is in an inactive (e.g., sleep) state or together with the main processor 1521 while the main processor 1521 is in an active (e.g., an application execution) state. The co-processor 1523 may be implemented as a part of another component that is functionally related to the co-processor 1523. The memory 1530 may store a variety of data used by at least one component of the electronic device 1501, such as software, and input data or output data with respect to commands associated with the software. The memory 1530 may include the volatile memory 1532 and/or the nonvolatile memory 1534.

The program 1540 may be stored in the memory 1530 as software and may include an operating system 1542, a middleware 1544, or an application 1546.

The input device 1550 may be a device for receiving a command or data, which is used for a component of the electronic device 1501, from an outside (e.g., a user) of the electronic device 1501 and may include, for example, a microphone, a mouse, or a keyboard.

The sound output device 1555 may be a device for outputting a sound signal to the outside of the electronic device 1501 and may include a speaker used for general purposes, such as multimedia play or recordings play, and a receiver used only for receiving calls. The receiver and the speaker may be either integrally or separately implemented.

The display device 1560 may be a device for visually presenting information to the user and may include a display, a hologram device, or a projector and a control circuit for controlling a corresponding device. The display device 1560 may include a touch circuitry or a pressure sensor for measuring an intensity of pressure on the touch.

The audio module 1570 may convert a sound and an electrical signal in dual directions. The audio module 1570 may obtain the sound through the input device 1550 or may output the sound through an external electronic device wired or wirelessly connected to the sound output device 1555 or the electronic device 1501.

The sensor module 1576 may generate an electrical signal or a data value corresponding to an operating state (e.g., power or temperature) inside or an environmental state outside the electronic device 1501. The sensor module 1576 may include a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1577 may support a designated protocol wired or wirelessly connected to the external electronic device. The interface 1577 may include a high-definition multimedia interface (HDMI), a universal serial bus (USB) interface, an SD card interface, or an audio interface.

A connection terminal 1578 may include a connector that physically connects the electronic device 1501 to the external electronic device such as an HDMI connector, a USB connector, an SD card connector, or an audio connector (e.g., a headphone connector).

The haptic module 1579 may convert an electrical signal to a mechanical stimulation (e.g., vibration or movement) or an electrical stimulation perceived by the user through tactile or kinesthetic sensations. The haptic module 1579 may include a motor, a piezoelectric device, or an electric stimulator.

The camera module 1580 may shoot a still image or a video image. The camera module 1580 may include at least one lens, an image sensor, an image signal processor, or a flash.

The power management module 1588 may be a module for managing power supplied to the electronic device 1501 and may serve as at least a part of a power management integrated circuit (PMIC).

The battery 1589 may be a device for supplying power to at least one component of the electronic device 1501 and may include a non-rechargeable (primary) battery, a rechargeable (secondary) battery, or a fuel cell.

The communication module 1590 may establish a wired or wireless communication channel between the electronic device 1501 and the external electronic device and support communication execution through the established communication channel. The communication module 1590 may include at least one communication processor operating independently from the processor 1520 (e.g., the AP) and supporting the wired communication or the wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication module) and may communicate with the external electronic device using a corresponding communication module among them through the first network 1598 (e.g., the short-range communication network such as a Bluetooth, a WiFi direct, or an Infrared Data Association (IrDA)) or the second network 1599 (e.g., the long-distance wireless communication network such as a cellular network, an internet, or a computer network (e.g., LAN or WAN)). The above-mentioned various communication modules 1590 may be implemented into one chip or into separate chips, respectively.

The wireless communication module 1592 may identify and authenticate the electronic device 1501 using user information stored in the subscriber identification module 1596 in the communication network.

The antenna module 1597 may include one or more antennas to transmit or receive the signal or power to or from an external source. The communication module 1590 may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

The command or data may be transmitted or received between the electronic device 1501 and the external electronic device 1504 through the server 1508 connected to the second network 1599. Each of the electronic devices 1502 and 1504 may be the same or different types as or from the electronic device 1501. All or some of the operations performed by the electronic device 1501 may be performed by another electronic device or a plurality of external electronic devices. When the electronic device 1501 performs some functions or services automatically or by request, the electronic device 1501 may request the external electronic device to perform at least some of the functions related to the functions or services, in addition to or instead of performing the functions or services by itself. The external electronic device receiving the request may carry out the requested function or the additional function and transmit the result to the electronic device 1501. The electronic device 1501 may provide the requested functions or services based on the received result as is or after additionally processing the received result. A cloud computing, distributed computing, or client-server computing technology may be used.

Figure 16:
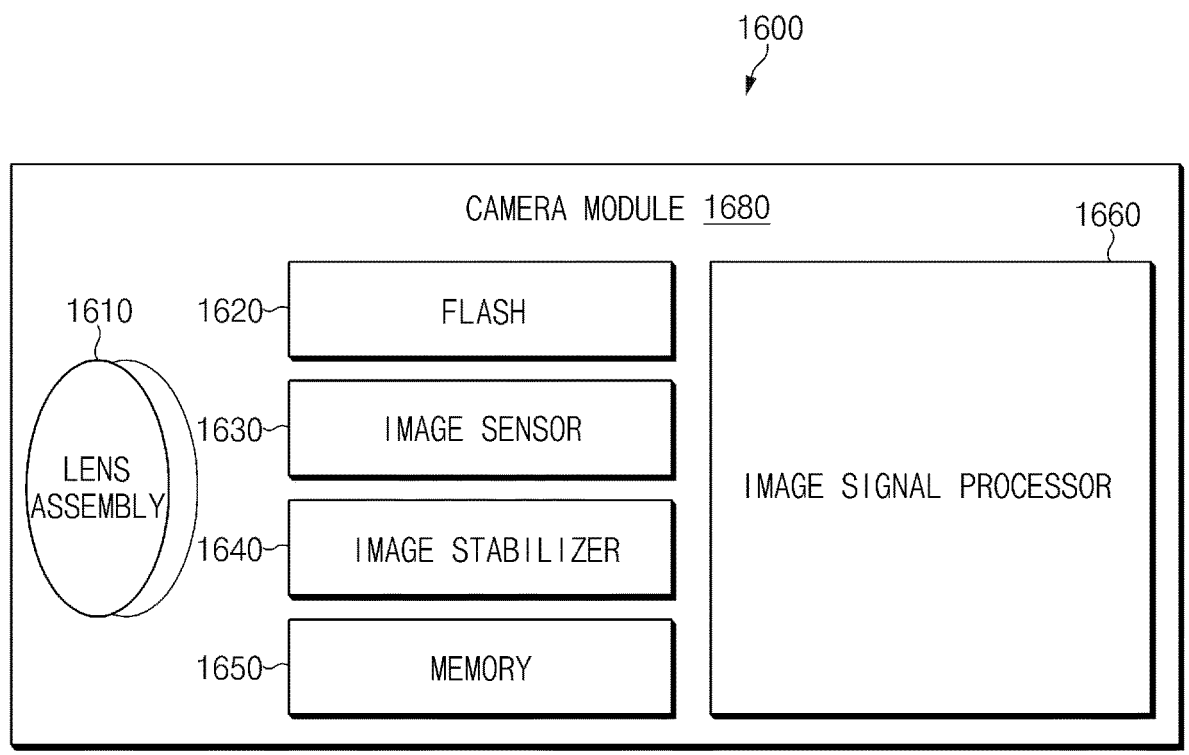
FIG. 16 is a diagram of a camera module, according to an embodiment.

FIG. 16 is a diagram 1600 of the camera module 1580, according to an embodiment.

Referring to FIG. 16, the camera module 1580 may include a lens assembly 1610, a flash 1620, an image sensor 1630, an image stabilizer 1640, memory 1650 (e.g., buffer memory), or an image signal processor 1660. The lens assembly 1610 may collect light emitted or reflected from an object whose image is to be taken. The lens assembly 1610 may include one or more lenses. The camera module 1580 may include a plurality of lens assemblies 1610. The camera module 1580 may form a dual camera, a 360-degree camera, or a spherical camera. When the lens assembly 1610 includes a plurality of lens assemblies, some of the plurality of lens assemblies may have the same lens attribute (e.g., view angle, focal length, auto-focusing, f number, or optical zoom), or at least one lens assembly may have one or more lens attributes different from those of another lens assembly. The lens assembly 1610 may include a wide-angle lens or a telephoto lens.

The flash 1620 may emit light that is used to reinforce light reflected from an object. The flash 1620 may include one or more LEDs (e.g., a red-green-blue (RGB), a white LED, an infrared (IR) LED, or an ultraviolet (UV) LED) or a xenon lamp. The image sensor 1630 may obtain an image corresponding to an object by converting light emitted or reflected from the object and transmitted via the lens assembly 1610 into an electrical signal. The image sensor 1630 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1630 may be implemented using a CCD sensor or a CMOS sensor.

The image stabilizer 1640 may move the image sensor 1630 or at least one lens included in the lens assembly 1610 in a particular direction, or control an operational attribute (e.g., adjust the read-out timing) of the image sensor 1630 in response to the movement of the camera module 1580 or the electronic device 1501 including the camera module 1580. This allows compensating for at least part of a negative effect (e.g., image blurring) by the movement on an image being captured. The image stabilizer 1640 may sense such a movement by the camera module 1580 or the electronic device 1501 using a gyro sensor or an acceleration sensor disposed inside or outside the camera module 1580. The image stabilizer 1640 may be implemented, for example, as an optical image stabilizer.

The memory 1650 may store, at least temporarily, at least part of an image obtained via the image sensor 1630 for a subsequent image processing task. If image capturing is delayed due to shutter lag or multiple images are quickly captured, a raw image obtained (e.g., a Bayer-patterned image, a high-resolution image) may be stored in the memory 1650, and its corresponding copy image (e.g., a low-resolution image) may be previewed via a display device. Thereafter, if a specified condition is met (e.g., by a user's input or system command), at least part of the raw image stored in the memory 1650 may be obtained and processed by the image signal processor 1660. The memory 1650 may be configured as at least part of the memory 1530 or as a separate memory that is operated independently from the memory 1530.

The image signal processor 1660 may perform one or more image processing with respect to an image obtained via the image sensor 1630 or an image stored in the memory 1650. The one or more image processing may include, for example, depth map generation, 3D modeling, panorama generation, feature point extraction, image synthesizing, or image compensation (e.g., noise reduction, resolution adjustment, brightness adjustment, blurring, sharpening, or softening). Additionally or alternatively, the image signal processor 1660 may perform control (e.g., exposure time control or read-out timing control) with respect to at least one of the components included in the camera module 1580. An image processed by the image signal processor 1660 may be stored back in the memory 1650 for further processing, or may be provided to an external component (e.g., the memory 1530, the display device 1560, the electronic device 1502, the electronic device 1504, or the server 1508) outside the camera module 1580. The image signal processor 1660 may be configured as at least part of the processor 1520, or as a separate processor that is operated independently from the processor 1520. If the image signal processor 1660 is configured as a separate processor from the processor 1520, at least one image processed by the image signal processor 1660 may be displayed, by the processor 1520, via the display device 1560 as it is or after being further processed.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product.

The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device, comprising:
a first camera;
a second camera; and
a processor configured to:
obtain a first image using the first camera and obtain a second image using the second camera;
determine depth information corresponding to an external object, using the first image and the second image;
when properties of the depth information meet a first specified condition,
connect the depth information with the first image and the second image, store the first image, the second image, and the depth information in one file using a specified format, and provide a refocus function when a request is received; and
when the properties of the depth information meet a second specified condition, skip the storing of the depth information in connection with the first image and the second image.

2. The electronic device of claim 1, further comprising:
a display,
wherein the processor is further configured to:
determine the depth information during at least a portion of outputting, at least a portion of the first image or the second image as a live view on the display; and
perform the storing of the depth information in response to an image capture request.

3. The electronic device of claim 1, wherein the processor is further configured to:
determine that the properties of the depth information meet the first specified condition when at least one of:
reference texture information meeting a specified reference texture condition is included in the depth information, ambient illumination intensity meets a specified illumination range, or
a distance between the external object and the electronic device meets a specified distance range.

4. The electronic device of claim 1, wherein the processor is further configured to:
when the properties of the depth information do not meet the first specified condition, determine that the properties of the depth information meet the second specified condition.

5. The electronic device of claim 1, wherein the second image comprises an image corresponding to an area where the first image is zoomed in on by a specified magnification.

6. The electronic device of claim 1, wherein the processor is further configured to:
determine a structure of a file which stores the first image and the second image using at least one of the depth information or shooting conditions.

7. The electronic device of claim 1, wherein the processor further is configured to:
obtain the first image and the second image by selectively using the first camera or the second camera depending on at least one of a distance between the external object and the electronic device or ambient illumination intensity.

8. The electronic device of claim 1, further comprising:
a display,
wherein the processor is further configured to:
when at least one of the first image or the second image, which is stored in connection with the depth information, is selected, output a representative image among images including the first image and the second image on the display.

9. The electronic device of claim 1, wherein the processor is further configured to:
when a request to change a focus area of at least one of the first image or the second image, which is stored in connection with the depth information, is received, change the focus area of the at least one of the first image or the second image based on the depth information in response to the request.

10. The electronic device of claim 1, wherein the processor is further configured to:
when a request to adjust a background blur level of at least one of the first image or the second image, which is stored in connection with the depth information, is received, adjust the background blur level of the at least one of the first image or the second image based on the depth information in response to the request.

11. A control method of an electronic device by at least one processor, the method comprising:
obtaining a first image using a first camera of the electronic device and a second image using a second camera of the electronic device;
determining depth information corresponding to an external object, using the first image and the second image;
when properties of the depth information meet a first specified condition,
connecting the depth information with the first image and the second image, storing the first image, the second image, and the depth information in one file using a specified format, and providing a refocus function when a request is received; and
when the properties of the depth information meet a second specified condition, skipping the storing of the depth information in connection with the first image and the second image.

12. The method of claim 11, wherein determining the depth information is performed during at least a portion of outputting at least a portion of the first image or the second image as a live view on a display of the electronic device; and
wherein storing the depth information is performed in response to an image capture request.

13. The method of claim 11, further comprising:
determining that the properties of the depth information meet the first specified condition when at least one of:
reference texture information meeting a specified reference texture condition is included in the depth information,
ambient illumination intensity meets a specified illumination range, or
a distance between the external object and the electronic device meets a specified distance range.

14. The method of claim 11, further comprising:
when the properties of the depth information do not meet the first specified condition, determining that the properties of the depth information meet the second specified condition.

15. The method of claim 11, wherein determining the depth information comprises:
determining the depth information for a duplicated area between the first image and the second image.

16. The method of claim 11, wherein obtaining the first image and the second image comprises:
obtaining the first image and the second image by selectively using the first camera or the second camera depending on at least one of a distance between the external object and the electronic device or ambient illumination intensity.

17. The method of claim 11, further comprising:
determining a structure of a file which stores the first image and the second image using at least one of the depth information or shooting conditions.

18. The method of claim 11, further comprising:
when a request to change a focus area of at least one of the first image or the second image, which is stored in connection with the depth information, is received, changing the focus area of the at least one of the first image or the second image based on the depth information in response to the request.

19. The method of claim 11, further comprising:
when a request to adjust a background blur level of at least one of the first image or the second image, which is stored in connection with the depth information, is received, adjusting the background blur level of the at least one of the first image or the second image based on the depth information in response to the request.

* * * * *